United States Patent
Degenstein et al.

(10) Patent No.: US 10,385,861 B2
(45) Date of Patent: *Aug. 20, 2019

(54) METHOD FOR COMPRESSING AN INCOMING FEED AIR STREAM IN A CRYOGENIC AIR SEPARATION PLANT

(71) Applicants: Nick J. Degenstein, East Amherst, NY (US); Lee J. Rosen, Buffalo, NY (US); Ahmed F. Abdelwahab, Clarence Center, NY (US); Carl L. Schwarz, East Aurora, NY (US); Reh-Lin Chen, Williamsville, NY (US); Henry E. Howard, Grand Island, NY (US)

(72) Inventors: Nick J. Degenstein, East Amherst, NY (US); Lee J. Rosen, Buffalo, NY (US); Ahmed F. Abdelwahab, Clarence Center, NY (US); Carl L. Schwarz, East Aurora, NY (US); Reh-Lin Chen, Williamsville, NY (US); Henry E. Howard, Grand Island, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 392 days.

This patent is subject to a terminal disclaimer.

(21) Appl. No.: 14/883,857

(22) Filed: Oct. 15, 2015

(65) Prior Publication Data

US 2016/0033197 A1 Feb. 4, 2016

Related U.S. Application Data

(63) Continuation-in-part of application No. 13/644,066, filed on Oct. 3, 2012, now Pat. No. 9,175,691, and a
(Continued)

(51) Int. Cl.
*F25J 3/04* (2006.01)
*F04D 17/12* (2006.01)
(Continued)

(52) U.S. Cl.
CPC ........... *F04D 27/004* (2013.01); *F04D 17/12* (2013.01); *F04D 25/16* (2013.01);
(Continued)

(58) Field of Classification Search
CPC ...... F04D 27/004; F04D 29/266; F04D 17/12; F04D 27/0261; F25J 3/04133;
(Continued)

(56) References Cited

U.S. PATENT DOCUMENTS 2,743,080 A * 4/1956 Feilden .................. F01D 5/066
416/201 R
3,767,318 A 10/1973 Shirato et al.
(Continued)

FOREIGN PATENT DOCUMENTS

EP 1586838 A1 10/2005
GB 2 316 772 A 3/1998
(Continued)

*Primary Examiner* — Christopher S Bobish
(74) *Attorney, Agent, or Firm* — Robert J. Hampsch

(57) ABSTRACT

A method for compression of an incoming feed air stream using at least two variable speed compressor drive assemblies controlled in tandem is provided. The first variable speed drive assembly drives at least one compression stage in the lower pressure compressor unit driven while the second variable speed drive assembly drives higher pressure compression stage disposed either in the common air compression train or the split functional compression train of the air separation plant. The first and second variable speed drive assemblies are preferably high speed, variable speed electric motor assemblies each having a motor body, a motor housing, and a motor shaft with one or more impellers directly and rigidly coupled to the motor shaft via a sacrificial rigid shaft coupling.

14 Claims, 13 Drawing Sheets

Related U.S. Application Data continuation-in-part of application No. 13/946,371, filed on Jul. 19, 2013, now Pat. No. 9,371,835.

(51) Int. Cl.
 *F04D 25/16* (2006.01)
 *F04D 27/00* (2006.01)
 *F04D 27/02* (2006.01)
 *F04D 29/26* (2006.01)

(52) U.S. Cl.
 CPC ..... *F04D 27/0261* (2013.01); *F04D 27/0269* (2013.01); *F04D 29/266* (2013.01); *F25J 3/0409* (2013.01); *F25J 3/04018* (2013.01); *F25J 3/04024* (2013.01); *F25J 3/0429* (2013.01); *F25J 3/04133* (2013.01); *F25J 3/04296* (2013.01); *F25J 3/04303* (2013.01); *F25J 3/04412* (2013.01); *F25J 3/04678* (2013.01); *F25J 3/04781* (2013.01); *F25J 3/04884* (2013.01); *F25J 3/04957* (2013.01); *F05D 2260/311* (2013.01); *F25J 2230/20* (2013.01); *F25J 2230/24* (2013.01); *F25J 2230/30* (2013.01); *F25J 2230/40* (2013.01); *F25J 2250/02* (2013.01)

(58) Field of Classification Search
 CPC .. F25J 3/04018; F25J 3/04109; F25J 3/01145; F25J 3/04781; F25J 3/04957; F25J 2230/30; F04B 23/04; F04B 41/06
 USPC ...................................................... 417/423.5
 See application file for complete search history.

(56) References Cited

U.S. PATENT DOCUMENTS

| | | | | |
|---|---|---|---|---|
| 3,905,201 | A * | 9/1975 | Coveney | F25J 3/04018 62/646 |
| 3,974,645 | A | 8/1976 | Smith | |
| 4,102,604 | A | 7/1978 | Rutshtein et al. | |
| 4,151,725 | A | 5/1979 | Kountz et al. | |
| 4,218,191 | A | 8/1980 | Stewart | |
| 4,342,201 | A * | 8/1982 | Ishii | B01J 19/0013 62/238.4 |
| 5,203,179 | A | 4/1993 | Powell | |
| 5,282,726 | A | 2/1994 | Warren | |
| 5,355,691 | A | 10/1994 | Sullivan et al. | |
| 5,428,965 | A | 7/1995 | Grunwald et al. | |
| 5,758,515 | A * | 6/1998 | Howard | F25J 3/04018 62/646 |
| 5,878,598 | A | 3/1999 | Higginbotham | |
| 5,893,276 | A * | 4/1999 | Higginbotham | F25J 3/0409 62/651 |
| 5,901,579 | A | 5/1999 | Mahoney et al. | |
| 5,921,106 | A * | 7/1999 | Girault | F25J 3/04018 62/613 |
| 5,947,680 | A | 9/1999 | Harada et al. | |
| 5,989,312 | A | 11/1999 | Barnhard et al. | |
| 6,402,482 | B1 * | 6/2002 | Lee | F01D 15/08 417/243 |
| 6,579,078 | B2 * | 6/2003 | Hill | F04D 17/122 417/228 |
| 6,616,421 | B2 | 9/2003 | Mruk et al. | |
| 6,755,620 | B2 | 6/2004 | Nakamura et al. | |
| 6,802,696 | B1 * | 10/2004 | Verhaegen | F04C 23/001 417/2 |
| 6,979,078 | B2 | 12/2005 | Ito et al. | |
| 7,044,716 | B2 | 5/2006 | Fabry | |
| 7,632,337 | B2 * | 12/2009 | Howard | B01D 53/047 62/643 |
| 8,277,197 | B2 | 10/2012 | Lelong et al. | |
| 8,376,718 | B2 | 2/2013 | Baker et al. | |
| 8,647,076 | B2 | 2/2014 | Baker et al. | |
| 8,939,732 | B2 | 1/2015 | Kim et al. | |
| 9,022,747 | B2 | 5/2015 | Fletcher et al. | |
| 9,109,603 | B2 | 8/2015 | Peussa | |
| 9,217,423 | B2 * | 12/2015 | Chen | F03G 7/06 |
| 9,360,002 | B2 * | 6/2016 | Sassanelli | F04D 13/14 |
| 2004/0101411 | A1 | 5/2004 | Nichol et al. | |
| 2005/0223737 | A1 | 10/2005 | Conry | |
| 2005/0265819 | A1 | 12/2005 | Kotani et al. | |
| 2006/0198744 | A1 | 9/2006 | Lifson et al. | |
| 2007/0065300 | A1 | 3/2007 | Mariani et al. | |
| 2007/0186582 | A1 | 8/2007 | Guillard | |
| 2007/0189905 | A1 | 8/2007 | Dinsdale et al. | |
| 2007/0209389 | A1 | 9/2007 | Prosser | |
| 2008/0092589 | A1 * | 4/2008 | Tranier | B01D 53/1475 62/640 |
| 2009/0100864 | A1 * | 4/2009 | Den Held | F25J 3/04018 62/643 |
| 2012/0230840 | A1 | 9/2012 | Fletcher et al. | |
| 2012/0260693 | A1 * | 10/2012 | DeMore | F04B 35/04 62/644 |
| 2012/0263605 | A1 | 10/2012 | DeMore et al. | |
| 2013/0312427 | A1 | 11/2013 | Hashi et al. | |
| 2014/0093396 | A1 | 4/2014 | Stanko et al. | |
| 2015/0211539 | A1 | 7/2015 | Wang | |
| 2016/0076545 | A1 * | 3/2016 | Sorokes | F04D 17/10 415/199.1 |

FOREIGN PATENT DOCUMENTS

| | | |
|---|---|---|
| WO | 2011/017783 A1 | 2/2011 |
| WO | WO 2011/017783 A2 | 2/2011 |
| WO | WO 2013/087606 A1 | 6/2013 |

* cited by examiner

FIG. 4

METHOD FOR COMPRESSING AN INCOMING FEED AIR STREAM IN A CRYOGENIC AIR SEPARATION PLANT

CROSS REFERENCE TO RELATED APPLICATIONS

The present application is a continuation-in-part (CIP) application and claims the benefit of and priority to U.S. patent application Ser. No. 13/644,066 filed on Oct. 3, 2012, and U.S. patent application Ser. No. 13/946,371 filed on Jul. 19, 2013 the disclosures of which is incorporated by reference herein.

TECHNICAL FIELD

The present invention relates to the compression of an incoming feed air stream in a cryogenic air separation plant, and more specifically, to a method for compression of an incoming feed air stream using at least two direct drive compression assemblies controlled in tandem.

BACKGROUND

Cryogenic air separation is a very energy intensive process because of the need to generate high pressure, very low temperature air streams and the large amount of refrigeration needed to drive the process. In a typical cryogenic air separation plant, an incoming feed air stream is passed through a main air compressor (MAC) arrangement to attain a desired intermediate discharge pressure and flow. Prior to such compression, dust and other contaminants are typically removed from the incoming feed air stream via an air filter typically disposed in an air suction filter house. The filtered air stream is compressed in a multi-stage MAC compression arrangement typically to a minimum pressure of about 6 bar and often at higher pressures. The compressed, incoming feed air stream is then purified in a pre-purification unit to remove high boiling contaminants from the incoming feed air stream. Such a pre-purification unit typically has beds of adsorbents to adsorb such contaminants as water vapor, carbon dioxide, and hydrocarbons. In many air separation plants the compressed, purified feed air stream or portions thereof are further compressed in a series of booster air compressor (BAC) arrangements to even higher discharge pressures. In conventional air separation plants, the MAC compression arrangements are located upstream of pre-purification unit whereas the BAC arrangements are located downstream of pre-purification unit.

The compressed or further compressed, purified feed air streams are then cooled and separated into oxygen-rich, nitrogen-rich, and argon-rich fractions in a plurality of distillation columns that may include a higher pressure column, a lower pressure column, and optionally, argon column (not shown). As indicated above, prior to such distillation the compressed, pre-purified feed air stream is often split into a plurality of compressed, pre-purified feed air streams, some or all of which are then passed to a multi-stage BAC compression arrangement to attain the desired pressures required to boil the oxygen produced by the distillation column system. The plurality of compressed, pre-purified feed air streams including any further compressed, pre-purified feed air streams are then cooled within the primary or main heat exchanger to temperatures suitable for rectification in the distillation column system. The sources of the cooling the plurality of feed air streams in the primary heat exchanger typically include one or more waste streams generated by the distillation column system as well as any supplemental refrigeration generated by the cold turbine and warm turbine arrangements, described below.

The plurality of cooled, compressed air streams are then directed to two-column or three column cryogenic air distillation column system which includes a higher pressure column thermally linked or coupled to a lower pressure column, and an optional argon column. Prior to entering the higher pressure column and lower pressure columns, any liquid air streams may be expanded in a Joule-Thompson valve to produce still further refrigeration required for producing the cryogenic products, including liquid oxygen, liquid nitrogen and/or liquid argon.

In air separation units designed to produce a large amount of liquid products, such as liquid oxygen, liquid nitrogen and liquid argon, a large amount of supplemental refrigeration must be provided, typically through the use of Joule-Thompson valves, described above, cold turbine arrangements and/or warm recycle turbine arrangements. Cold turbine arrangements are often referred to as either a lower column turbine (LCT) arrangement or an upper column turbine (UCT) arrangement which are used to provide supplemental refrigeration to a two-column or three column cryogenic air distillation column system. On the other hand, a warm recycle turbine (WRT) arrangement expands a refrigerant stream in a warm turbo-expander with the resulting exhaust stream, cooled via expansion of the refrigerant stream, imparting supplemental refrigeration to the cryogenic air distillation column system via indirect heat exchange with the pre-purified, compressed feed air in the primary heat exchanger or in an auxiliary heat exchanger.

In the LCT arrangement, a portion of the pre-purified, compressed feed air is further compressed in a BAC compression arrangement, partially cooled in the primary heat exchanger, and then all or a portion of this further compressed, partially cooled stream is diverted to a turbo-expander, which may be operatively coupled to and drive a compressor. The expanded gas stream or exhaust stream is then directed to the higher pressure column of a two-column or three column cryogenic air distillation column system. The supplemental refrigeration created by the expansion of the diverted stream is thus imparted directly to the higher pressure column thereby alleviating some of the cooling duty of the primary heat exchanger.

Similarly, in the UCT arrangement, a portion of the purified and compressed feed air is partially cooled in the primary heat exchanger, and then all or a portion of this partially cooled stream is diverted to a warm turbo-expander, which may also be operatively coupled to and drive a compressor. The expanded gas stream or exhaust stream from the warm turbo-expander is then directed to the lower pressure column in the two-column or three column cryogenic air distillation column system. The cooling or supplemental refrigeration created by the expansion of the exhaust stream is thus imparted directly to the lower pressure column thereby alleviating some of the cooling duty of the primary heat exchanger.

The MAC compression arrangement and BAC compression arrangement require significant amount of power to achieve the required compression. Typically, the MAC compression arrangement consumes roughly 60% to 70% of the total power consumed by the air separation plant. While a portion of the air separation plant power requirement may be recovered via the above-described cold turbine arrangement and/or warm turbine arrangement which provide the supplemental refrigeration to the two-column or three column cryogenic air distillation column system, the vast majority of the power required by the air separation plant is externally supplied power to drive the multi-stage MAC compression arrangement and the multi-stage BAC compression arrangement.

Most conventional MAC compression arrangements and BAC compression arrangements as well as nitrogen recycle compressors and related product compressors are configured as an integrally geared compressor (IGC) arrangements that include one or more compression stages coupled to a single speed drive assembly, and a gearbox adapted for driving the one or more of the compression stages via a bull gear and associated pinion shafts such that all pinion shafts operate at constant speed ratios. The one or more compression stages typically use a centrifugal compressor in which the feed air entering an inlet is distributed to a vaned compressor wheel known as an impeller that rotates to accelerate the feed air and thereby impart the energy of rotation to the feed air. This increase in energy is accompanied by an increase in velocity and a pressure rise. The pressure is recovered in a static vaned or vaneless diffuser that surrounds the impeller and functions to decrease the velocity of the feed air and thereby increase the pressure of the feed air. The impellers may be arranged either on multiple shafts or on a single shaft coupled to the single speed drive. Where multiple shafts are used, a gearbox and associated lube oil system are typically required.

The conventional MAC compression arrangements further require a plurality of intercoolers provided between the multiple stages of the compressor to remove the heat of compression from the compressed air stream between each compression stage. The reason for this is as the air is compressed, its temperature rises and the elevated air temperature requires an increase in power to compress the gas. Thus, when the air is compressed in stages and cooled between stages, the compression power requirement is reduced due to closer to isothermal compression compared to compression without interstage cooling. An aftercooler, such as a direct contact aftercooler, or air chiller are also typically positioned between the MAC compression arrangement and BAC compression arrangement.

It has been suggested to replace portions of the conventional IGC arrangements with a direct drive compressor assembly arrangement. The direct coupling of the compressor and the drive assembly overcomes the inefficiencies inherent in a gear box arrangement in which thermal losses occur within the gearing between the drive assembly and the compression stages. Such a direct coupling is known as a direct drive compressor assembly where both drive assembly shaft and the impeller rotate at the same speed. Typically such direct drive compressor assemblies are capable of variable speed operation. A direct drive compressor assembly can thereby be operated to deliver a range of flow rates through the multiple compression stages and a range of pressure ratios across the compressor units by varying the drive speed.

In addition, most conventional MAC compression arrangements are designed to be optimized at a design point corresponding to a point at or near peak flow capacity. However, in many air separation plants, it has been found that compressors typically operate at their respective design conditions less than 10% of the time and, in some plants, less than 5% of the time. The peak flow capacity of the MAC compression arrangement and BAC compression arrangement will be limited by centrifugal impeller size that can be manufactured by compressor manufacturers and the allowable impeller tip speed. In conventional systems, all MAC compression stages are often driven by the same power train or drive. Therefore, once a design speed is selected for this MAC drive, there is little room to change the speed, since any speed change will impact all of the MAC compression stages as well as any of the BAC compression stages that may be also coupled to the same power train. Using this traditional design point, conventional MAC compression arrangements can often achieve a turndown (i.e. decreasing the flow rate of the air that is compressed) of only about 30% turndown using inlet guide vanes associated with one or more of the compression stages.

For any given air separation plant, while the air inlet pressure is generally constant, the ambient air inlet temperature can vary significantly from winter to summer, or even from day to night, leading to considerable variation in volumetric flow. Once the design speed is selected, there is little room to change this speed to accommodate seasonal temperature and/or production changes. Thus, the most effective compressor performance control variable, i.e., drive speed, is not a degree of freedom to use for operational control of most conventional MAC and BAC compression arrangements.

For example, to handle the required flow and the head for the summer high temperature condition, the MAC compression arrangement will need to be sized for the summer high temperature condition and inlet guide vanes will be partially closed to handle normal operating conditions. This could reduce the compressor efficiency for other operating conditions and also reduce the plant turndown range (i.e. the range from the design flow to the minimum allowable flow without compressor surge). During turndown conditions, the volumetric flow is reduced and therefore, the inlet guide vanes have to be closed further and, in some cases, compressed air may have to be vented to the atmosphere to prevent the compressors from surging. Closing of the inlet guide vanes and/or venting a portion of the compressed air both translate to waste of power and a decrease in overall plant efficiency.

Also, to optimize the air separation cycles, the compression trains of most air separation plants, including plants using direct drive compression assemblies as part of the air compression trains, are designed to provide generally constant discharge pressures to the pre-purification unit in the case of the MAC compression arrangement or pressures required by the distillation column system in the case of a BAC compression arrangement. Maintaining a generally constant discharge pressure in such air separation plants may also translate to waste of power and a decrease in overall plant efficiency across all operating conditions. There is also a need to allow for continual or periodic adjustments to the incoming feed air flow capacity and/or discharge pressures of the air compression trains without sacrificing overall air separation plant efficiency.

Accordingly, there is a continuing need to reduce the operating costs, namely power costs, associated with air compression arrangements in an air separation plant by employing effective direct drive compression assemblies as part of the air compression trains. Prior art systems that employ direct drive compression assemblies as part of the air compression trains are discussed in more detail below in the detailed description section, which includes discussion of the differences between the present invention and the prior art direct drive compression assemblies for air separation plants.

SUMMARY OF THE INVENTION

The present invention may be characterized as a method for compression of an incoming feed air stream comprising the steps of: (a) compressing at least a portion of the incoming feed air stream in a lower pressure single stage or multi-stage compressor of a common air compression train, at least one compression stage in the lower pressure single stage or multi-stage compressor driven directly by a first variable speed drive assembly; (b) further compressing the compressed feed air stream in one or more intermediate pressure compression stages of the common air compression train; (c) further compressing the compressed, purified stream in one or more higher pressure single stage or multi-stage compressors of the common air compression train, wherein at least one of the higher pressure single stage or multi-stage compressors are driven by a second variable speed drive assembly; (d) purifying the further compressed feed air stream to remove impurities either after step (a), after step (b), or after step (c); (e) directing one or more portions of the compressed and purified feed air stream to a split functional air compression train; (f) directing the one or more of the portions of the compressed and purified feed air stream in the split functional air compression train to a primary heat exchanger in order to cool the one or more portions to temperatures suitable for rectification in a distillation column system of the cryogenic air separation plant; and (g) directing some or all of the one or more of the portions of the cooled, compressed and purified feed air stream to the distillation column system of the cryogenic air separation plant to produce liquid and gaseous products.

The compression stage or stages in the lower pressure compressor unit driven by the first variable speed drive assembly may be arranged as a single ended configuration (i.e. one lower pressure compression stage) or as a double ended configuration (i.e. two lower pressure compression stages). When arranged in a double ended configuration, the compression stages in the lower pressure compressor unit driven by the first variable speed drive assembly may be arranged as series compression steps or alternatively may be arranged as parallel compression steps preferably having a common feed and a common outlet. When arranged in a parallel compression arrangement, the volumetric flows of the incoming ambient pressure air being compressed may be approximately the same volumetric flows or may be different volumetric flows. Also, the use of inlet guide vanes on the lower pressure compression stage or stages may be employed to assist in the control of the air flows through the common air compression train.

The compression stage or stages in the higher pressure compressor unit driven by the second variable speed drive assembly may also be arranged as a single ended configuration (i.e. one higher pressure compression stage) or as a double ended configuration (i.e. two higher pressure compression stages). The intermediate compression stages in the common air compression train may be configured as an integrally geared compressor or may be driven by yet another variable speed drive assembly.

Similarly, any compression stages in the split functional air compression train, including any boiler air compressors or turbine air compressors may configured as an integrally geared compressor or may be driven by the shaft work of the turbo-expanders or may be driven by still other variable speed drive assemblies. The split functional air compression train preferably includes a boiler air circuit for handling a portion of the compressed and purified air stream and a turbine air circuit for handling another portion of the compressed and purified air stream. The boiler air circuit preferably includes one or more stages of boiler air compression. The turbine air circuit may further comprise an upper column turbine circuit, a lower column turbine circuit, a warm recycle turbine circuit, or combinations thereof having one or more stages of turbine air compression or recycle air compression.

From a compression train control standpoint, the volumetric flow of the incoming feed air stream is preferably controlled by adjusting the speed of the first variable speed drive assembly in response to changes in the operating conditions of the cryogenic air separation plant such that a discharge pressure from the common air compression train is a variable discharge pressure that changes by adjusting the speed of the first variable speed drive assembly and/or the second variable speed drive assembly in response to changes in the operating conditions of the cryogenic air separation plant. Operating conditions of the plant may include such conditions as turndown conditions or even ambient air conditions.

Other aspects of the compression train control is to adjust the speed of the second variable speed drive assembly based, in part on the speed of the first variable speed drive assembly. For example, the speed of the first variable speed drive assembly may be set in response to a measured flow rate of air in the common air compression train and the speed of the second variable speed drive assembly may be set in response to a measured pressure of at least one of the portions of purified, compressed air streams in the split functional air compression train in conjunction with the speed of the first variable speed drive assembly. Alternatively, the speed of the second variable speed drive assembly may be set in response to a discharge pressure in the common air compression train and the speed of the first variable speed drive assembly.

Another control option is to control the speed of the first variable speed drive assembly in response to the measured flow rate of air in the common air compression train and one or more process limits, compressor limits, or drive assembly limits. The speed of the second variable speed drive assembly would also be set or adjusted in response to similar process limits, compressor limits, or drive assembly limits in conjunction with the speed of the first variable speed drive assembly.

BRIEF DESCRIPTION OF THE DRAWINGS

While the specification concludes with claims specifically pointing out the subject matter that Applicants regard as the inventions, it is believed that the subject matter of the inventions will be better understood when taken in connection with the accompanying drawings in which:

FIG. 4 is a schematic flow diagram of a cryogenic air separation plant incorporating an alternative arrangement for the compression of an incoming feed air stream in a cryogenic air separation plant in accordance with the present invention;

DETAILED DESCRIPTION

Figure 1:
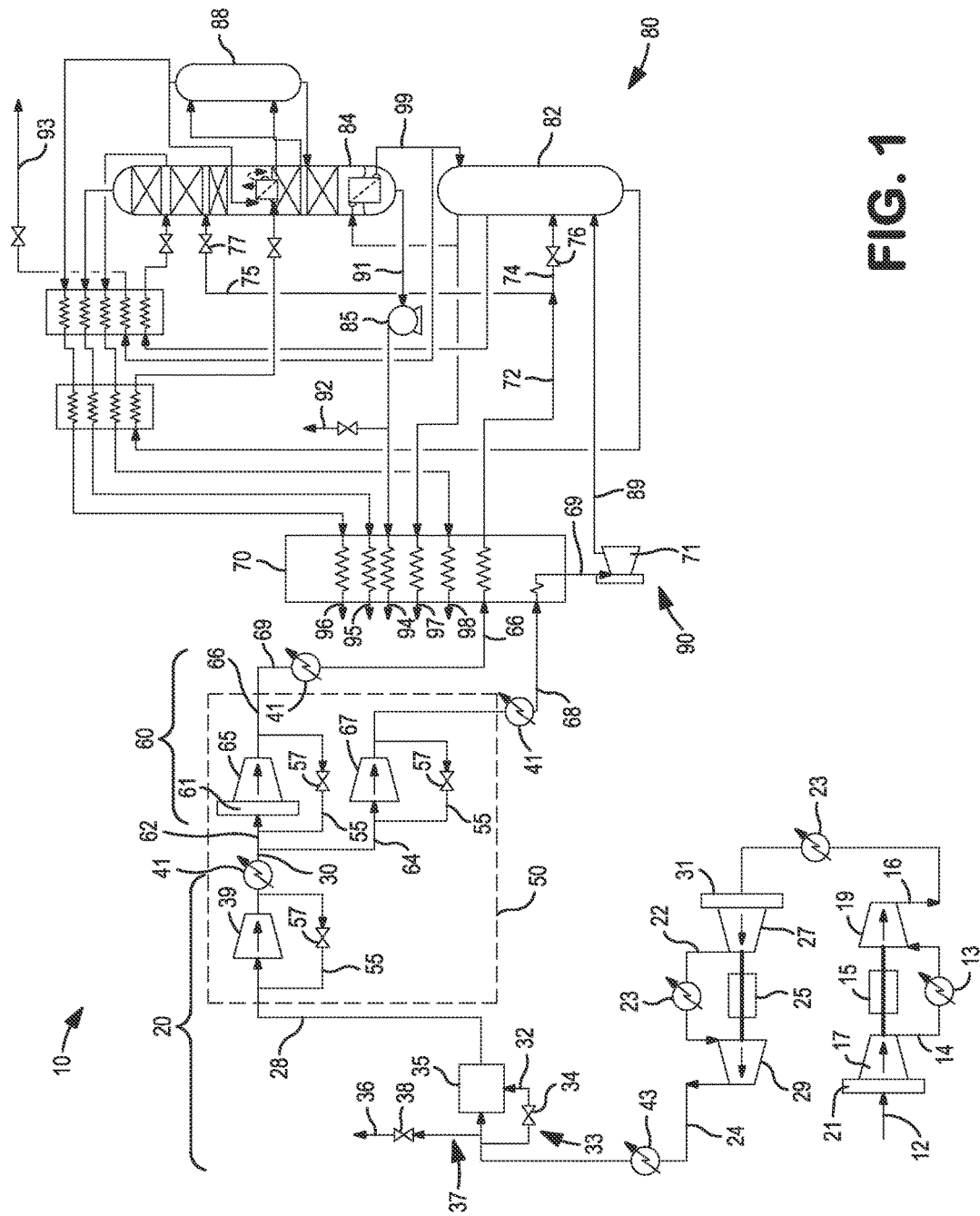
FIG. 1 is a schematic flow diagram of a cryogenic air separation plant incorporating one of the preferred methods for the compression of an incoming feed air stream in a cryogenic air separation plant in accordance with the present invention.

As used herein, the phrase Common Air Compression (CAC) train means a plurality of compression stages, intercoolers, aftercoolers and pre-purification units that are configured to compress, cool, and pre-purify substantially all of an incoming feed air stream to a prescribed flow, pressure, and temperature condition. The common air compression train would typically include compressors in the MAC compression arrangement (or pre-MAC arrangement) and optionally one or more initial compression stages of the BAC compression arrangement, wherein each of the compressors within the common air compression train are configured for compressing substantially all of the incoming feed air stream.

As used herein, the phrase Split Functional Air Compression (SFAC) train means a plurality of compression stages, intercoolers, aftercoolers, turbo-expanders that compress, cool, and/or expand selected portions of the compressed, pre-purified air stream from the prescribed condition to two or more split streams having flow, pressure, and temperature conditions suitable for: (i) boiling liquid products from the distillation column system, (ii) producing cold turbine and/or warm turbine refrigeration for the distillation column system, and (iii) rectification in the distillation column system. The split functional air compression train would typically include one or more later compression stages of the BAC compression arrangement; compressors associated with any cold turbine refrigeration circuits such as an upper column turbine (UCT) air circuit and lower column turbine (LCT) air circuit; compressors associated with warm recycle refrigeration circuits such as a warm recycle turbine (WRT) air circuit, or other downstream compression stages configured for compressing less than substantially all of the compressed air stream from the common air compression train.

The term or phrase 'integrally geared compressor' (IGC) means one or more compression stages coupled to a single speed drive assembly, and a gearbox adapted for driving the one or more of the compression stages via a bull gear and associated pinion shafts such that all pinion shafts operate at constant speed ratios. For electric motor driven IGCs, the single speed is defined by the motor speed whereas in steam turbine driven IGCs, the single speed is preferably characterized as a very small speed range that is dependent on the steam turbine characteristics. In contrast, the term or phrase 'direct drive compressor assembly' (DDCA) means one or more compression stages driven by a variable speed drive assembly and that does not include a gear box or transmission.

Prior to providing a detailed discussion of the multiple embodiments of the present inventions, the subject matter of the present inventions may be better understood through comparison to conventional IGC based compression trains as well as comparison to some of the closest prior art direct driven compression assemblies discussed in the paragraphs that follow.

Most main air compression systems for cryogenic air separation plants require some type or form of air flow control. Conventionally, this air flow control involves adjustment of the inlet guide vanes (IGV) on one or more of the compression stages of an integrally geared compressor (IGC), and preferably the lowest pressure compression stage of a centrifugal air compressor of the MAC compression train. Alternate air flow control techniques or methods for air separation plants using conventional IGC include suction/discharge throttling, recirculation of the air, or venting of the air flow. IGVs are typically considered an efficient method of air flow control of a centrifugal air compressor because at a given speed of the IGC, the IGV reduces the air flow to the compression stage while the discharge pressure is maintained at acceptable levels. The overall isothermal efficiency of the IGC compressor with IGV based control is higher when compared to other conventional methods for compressor air flow control such as suction/discharge throttling or recirculation/venting. However, IGV based control alone on a typical centrifugal compressor are not as efficient in turn down conditions compared to an air compression system having compression stages driven by two or more variable speed motors such as the present systems and methods described herein.

Figure 2:
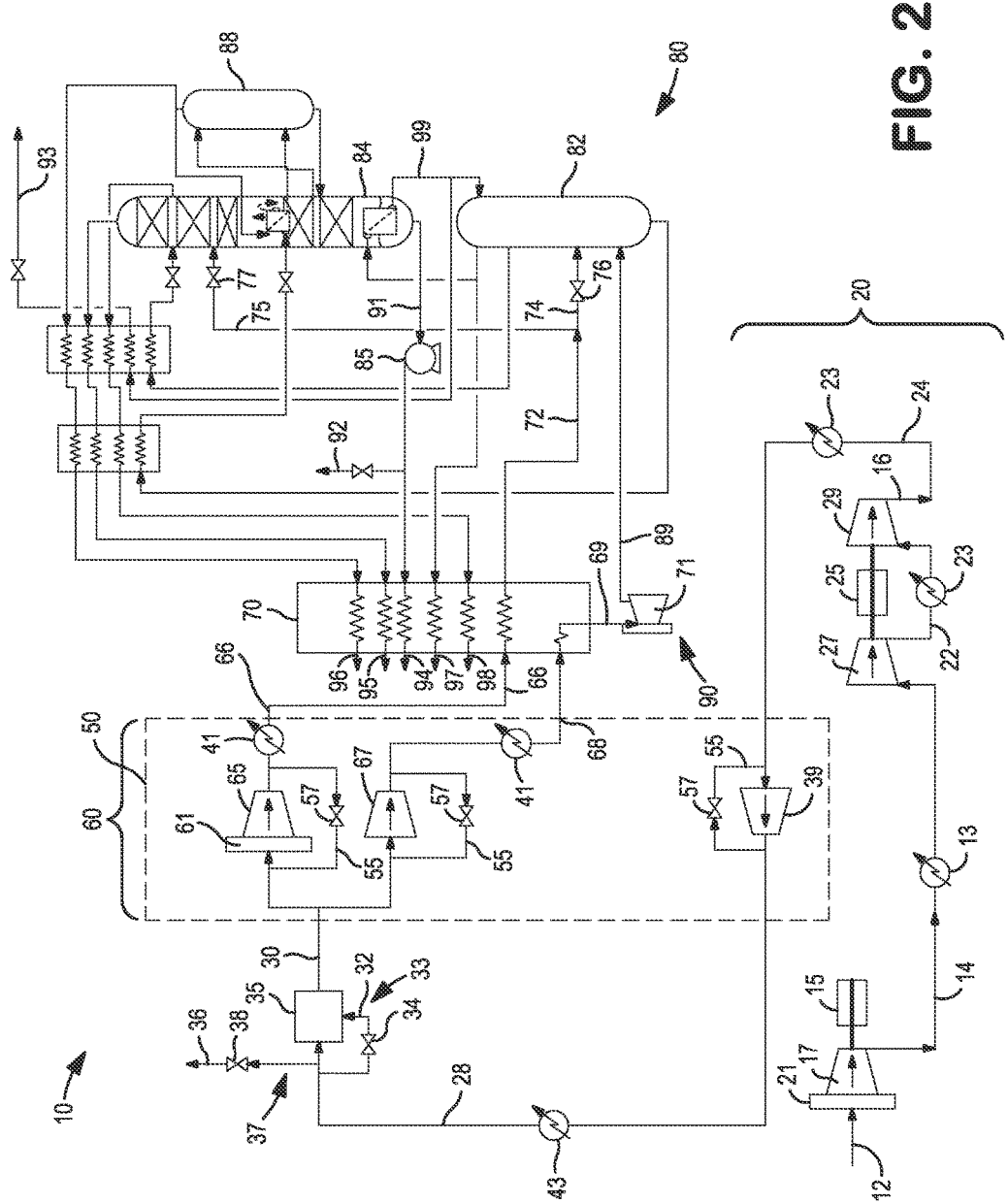
FIG. 2 is a schematic flow diagram of a cryogenic air separation plant incorporating another of the preferred methods for the compression of an incoming feed air stream in a cryogenic air separation plant in accordance with the present invention.
Figure 3:
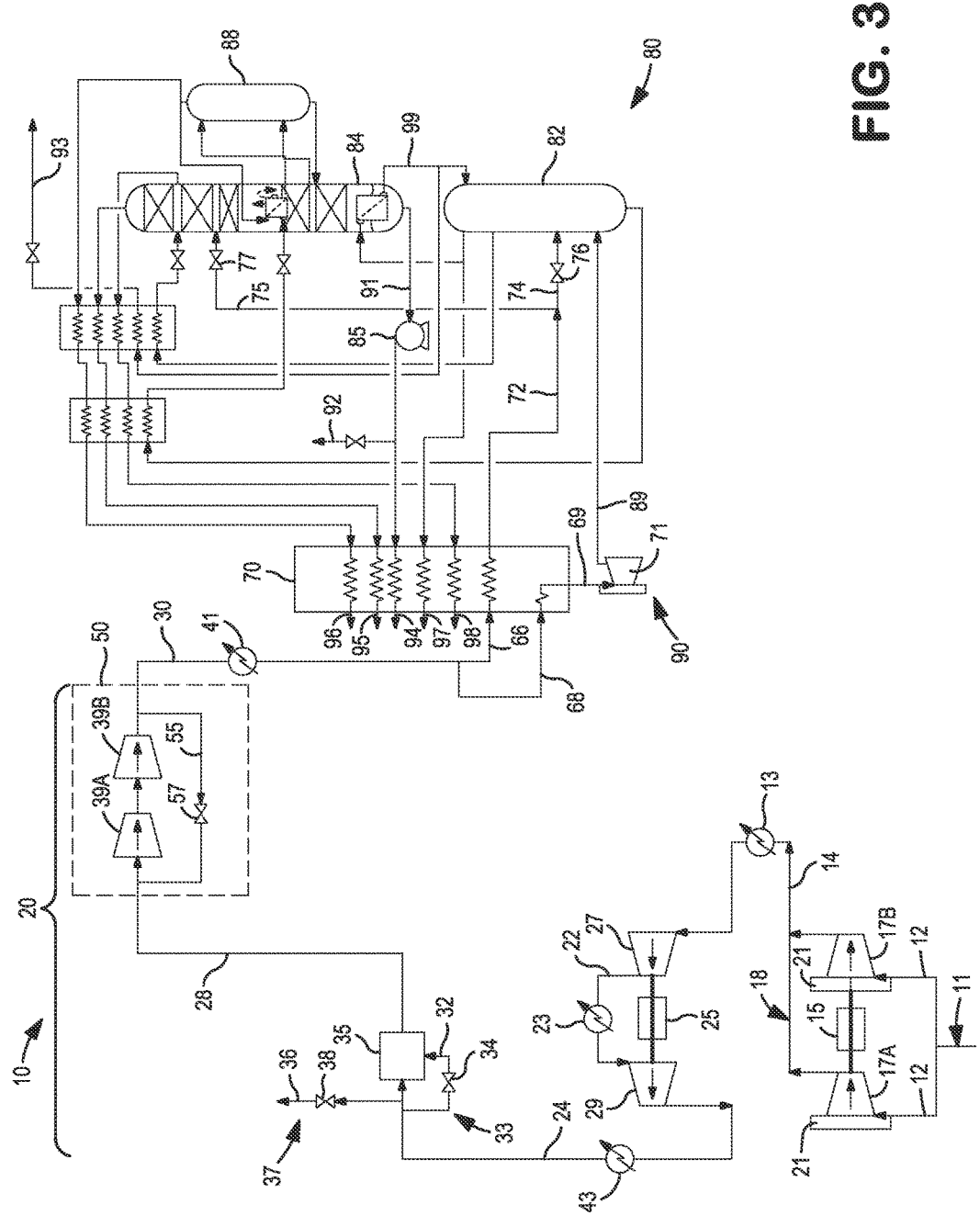
FIG. 3 is a schematic flow diagram of a cryogenic air separation plant incorporating yet another of the preferred methods for the compression of an incoming feed air stream in a cryogenic air separation plant in accordance with the present invention.

Fixed or single speed operation, used in most IGC based compression systems with or without IGV's, can be used to control air flow (i.e. flow~speed) but the discharge pressure decreases more rapidly with reductions in IGC drive speed (i.e. pressure~speed$^2$) giving a quadratic relationship between pressure and flow (i.e. pressure~flow$^2$). In general, this type of quadratic relationship between flow and pressure in a conventional IGC based system is not an ideal match for an air separation process. This quadratic relationship between pressure and flow however, is matched in a more efficient and beneficial manner using an air compression system having at least two variable speed motors, preferably operating at different motor speeds and motor speed ratios. Thus, air flow control using two variable speed motors in a cryogenic air separation plant (e.g. as shown in FIGS. 1-3) have several advantages over the conventional IGC based compression systems.

The advantages include the turn-down capabilities and turn-down efficiency of an air compression system using two variable speed motors in a cryogenic air separation plant compared to conventional IGC based compression systems using IGV's for air flow control. Table 1 compares the turndown capability and isothermal compression efficiency of a typical integrally geared centrifugal air compression machine using IGVs versus a direct drive compression assembly (DDCA) based air compression system having two variable speed motors without IGVs.

adjust the two motor speeds to maintain higher average wheel efficiency for a variety of air flows compared to the conventional IGC based centrifugal air compressor arrangement having only IGV control. In addition to the turndown capability and turndown efficiency benefits described above, this DDCA) based compression system having two variable speed motors—having two manipulated variables also allows for control of discharge pressure or some other system pressure in the compression train.

Adjustment of the DDCA discharge pressure or some other system pressure allows the plant operator to: (i) expand the possible operational envelope of the air separation plant in terms of achievable product slate; (ii) avoid compressor limitations and constraints such as surge conditions or pressure limits in the downstream functional air compression train or downstream common air compression train; and/or (iii) adjust operational characteristics of downstream turbines, etc. Addition of other manipulated variables such as a third variable speed motor and/or IGVs to the

TABLE 1

| | | IGC Compression System with IGV | | DDCA Compression System with two variable speed motors | | |
|---|---|---|---|---|---|---|
| Turndown Discharge Conditions | | | | | | |
| Air Flow (% relative to Design Case) | Turndown Discharge Pressure (% relative to Design Case) | Isothermal Efficiency Penalty (% relative to Design Case) | IGV position (% of full range) | Isothermal Efficiency Penalty (% relative to Design Case) | Motor #1 Speed (% relative to Design Case) | Motor #2 Speed (% relative to Design Case) |
| 100 (Design Case) | 100 (Design Case) | 0.0 | 3 | 0.0 | 100.0 | 100.0 |
| 95 | 97 | 0.6 | 35 | 0.1 | 98.0 | 100.0 |
| 90 | 94 | 1.6 | 54 | 0.2 | 95.2 | 100.9 |
| 85 | 92 | 2.9 | 69 | 0.4 | 92.0 | 102.2 |
| 80 | 89 | 4.3 | 82 | 0.7 | 88.6 | 103.8 |
| 75 | 87 | 5.5 | 98 | 1.1 | 85.3 | 105.1 |
| 70 | 85 | Operation not possible due to Surge, IGV or other compressor limits (without venting excess compressed air) | | 1.5 | 82.3 | 105.9 |
| 65 | 83 | | | 2.0 | 80.1 | 105.8 |
| 60 | 82 | | | 2.5 | 80.0 | 104.5 |
| 55 | 80 | | | 3.1 | 80.0 | 101.6 |
| 50 | 79 | | | 3.8 | 80.0 | 99.0 |

As seen in Table 1, a cryogenic air separation plant using the typical IGC based compression system with IGVs on the lowest pressure compression stage for air flow control typically cannot turn down by much more than about 25%. Plant turn down operating conditions requiring air flows between about 50% to 70% of the design air flow for the conventional IGC based compression systems will often encounter external system constraints or equipment constraints (e.g. surge conditions, surge margin, IGV limits, compressor limits, etc.) unless remedial actions are taken such as venting of excess compressed air. In addition, a relatively large isothermal efficiency penalty of up to about 5.5% or more is realized when turn-down of a typical IGC based compression system using IGVs is required.

In comparison, a cryogenic air separation plant using a DDCA based compression system having two variable speed motors has a turn down capability of up to about 50% of the design air flow before encountering external system constraints or equipment constraints with a much smaller isothermal efficiency penalty. Such turn down is achieved by adjusting the speeds of the two variable speed motors. As described in more detail below, the speed of the second variable speed motor preferably is adjusted based, in part, on the speed of the first variable speed motor. Furthermore, since two manipulated variables (i.e. motor 1 speed and motor 2 speed) are available to control, it is possible to above-described DDCA can also serve to increase air separation plant efficiency, turndown capability, turndown efficiency, and/or expansion of the air separation plant operational envelope.

In patent publication WO 2011/017783, a high-pressure multistage centrifugal compressor arrangement is disclosed. This Atlas-Copco compression arrangement includes four separate compressor elements or stages driven by two high speed electric motors. However, in one of the disclosed arrangements in WO 2011/017783, there are two initial compression stages arranged in parallel and driven directly by two separate high speed electric motors, wherein the two initial compression stages are configured to receive and compress ambient pressure air to produce a first and a second compressed air stream that are combined and directed in a serial arrangement with two subsequent compression stages. Each of the two subsequent compression stages is also driven directly by the same high speed electric motors driving the parallel initial compression stages. Specifically, the first high speed electric motor drives compression stage 1 (i.e. compression of ambient air) and compression stage 4 whereas the second high speed electric motor drives compression stage 2 (compression of ambient air) and compression stage 3. An alternative arrangement disclosed in WO 2011/017783 suggests all four of said compressor elements could be placed in series connection forming four consecutive stages with the first high speed electric motor driving a first low-pressure compressor element and a third compressor element of the third pressure stage, while the second high speed electric motor is driving the second compressor element as well as the fourth compressor element of the last stage.

The advantage of both arrangements disclosed in WO 2011/017783 is to provide a uniform load distribution over both high speed electric motors. However, a disadvantage of these Atlas-Copco compression arrangements is realized in that by adjusting the speed of the first high speed electric motor to control the air flowrate through the compression system, it also directly impacts the final discharge pressure from the total compression arrangement. In other words, the air flowrate and discharge pressure from this compression arrangement are inherently and inseparably linked and controlled together when adjusting the speed of the first high speed electric motor. Changing the speed of the first high speed electric motor also directly affects the discharge pressure from downstream compression stage 3 or compression stage 4 of the compression train. Also, the disclosed Atlas-Copco arrangement where compression stages 1 and 2 are in parallel requires identical control of the first and second high speed electric motors to achieve the desired balance loads.

Another similar high-pressure multi-stage centrifugal compressor arrangement is disclosed in another Atlas-Copco owned patent document, namely U.S. Pat. No. 7,044,716. This compressor arrangement contains three compressor elements which are arranged in series as compressor stages, and at least two high speed electric motors to drive these three compressor elements. Specifically, the low pressure stage is driven by a first high speed electric motor where the high pressure stages (i.e. compression stage 2 and stage 3) are driven by a second high speed electric motor. As taught in this patent, the Atlas-Copco direct drive compression arrangement replaces the single high pressure stage of a conventional IGC arrangement with two high-pressure stages which are driven by one and the same high-speed motor. By splitting the high-pressure stage in two stages, the pressure ratio per stage is reduced, so that the required rotational speed of the high-speed motor is also reduced. This design further allows the pressure ratios to be selected such that the specific speeds of the high-pressure compression stages do not deviate much from the optimal specific speed.

Another closely related prior art reference is U.S. Patent Application Publication No. 2007-0189905 which discloses a multi-stage compression system that includes a plurality of centrifugal compression stages with each stage having an impeller coupled to and driven by a variable speed electric motor. The multi-stage compression system also includes a control system that is connected to each of the variable speed motors and is operable to vary the speed of each motor such that the speed of each motor is varied simultaneously and that the ratio of the speed of the variable speed motors remains constant.

While the prior art references described above each disclose embodiments of a direct drive compression arrangement, none of the disclosed prior art arrangements are particularly suited for use in the compression train of large air separation plants. Thus, none of the above-identified direct drive compression arrangements disclose all of the elements and features of the air separation compression train disclosed and claimed herein.

Specifically, none of the prior art references identified above disclose intermediate compression stages disposed between the compression stages driven directly by the variable speed motors. Similarly, none of the prior art references identified above disclose or teach subsequent compression stages disposed downstream of direct driven compression stages to further compress the incoming feed air stream in a common air compression train or portions of the incoming feed air stream in a split functional air compression train. Furthermore, none of the prior art references identified above disclose compression stages directly driven by the second variable speed motor are configured to further compress a reduced volumetric flow of the feed air stream in the split functional air compression train.

In addition, none of the prior art references identified above disclose embodiments where the control of second variable speed motor is based, in part on speed of first electric motor or wherein a ratio of the speed of the variable speed motors is not maintained constant, as disclosed in the embodiments of the present invention.

Compression Train Arrangements

Turning to FIG. 1, there is shown a schematic flow diagram of a cryogenic air separation plant 10. An incoming feed air stream is filtered in an air suction filter house (not shown) which is typically a free standing structure with a plurality of hooded intakes, each having two or more stages of filtration made up of a plurality of filter panels per stage. The filtered incoming feed air stream 12 is then compressed in a lower pressure compressor unit 17 of the compression arrangement, which forms the initial compression stage of the common air compression train 20 to produce a first compressed air stream 14. The lower pressure compressor unit 17 is driven directly by a first variable speed drive assembly, shown as a first high speed and variable speed electric motor 15. The first compressed air stream 14 is cooled in intercooler 13 and then directed to a second compressor unit 19 of the compression arrangement, which forms the second compression stage of the common air compression train 20 and which is also driven directly by the first variable speed electric motor 15 to produce a second compressed air stream 16. Neither, either or both of the first lower pressure compressor unit 17 and the second compressor unit 19 may have inlet guide vanes 21 to assist in the control of the air flow through the common air compression train 20.

The second compressed air stream 16 is again cooled in intercooler 23 and directed to a third compressor unit 27 of the compression arrangement which forms the third compression stage of the common air compression train 20 to produces a third compressed air stream 22 and which is driven directly by a second variable speed drive assembly, shown as a second variable speed electric motor 25. After further cooling in another intercooler 23 to remove the heat of compression, the third compressed air stream 22 is still further compressed in a fourth compressor unit 29 of the compression arrangement, which forms the fourth compression stage of the common air compression train 20 and a fourth compressed air stream 24 and which is also driven directly by the second high speed, variable speed electric motor 25. Again, neither, either or both of the third and fourth compressor units 27, 29 may have inlet guide vanes 31 to assist in the control of the air flow through common air compression train 20.

Following the main air compression stages, the compressed feed air stream 24 is typically cooled and chilled using a direct contact aftercooler 43 or alternatively an indirect heat exchanger. Such direct contact aftercooler 43 is preferably designed with a low pressure drop and with high capacity packing to minimize capital cost and energy losses associated with the direct contact aftercooler 43. The aftercooler 43 is also designed to extract water droplets from the compressed feed air stream through the use of a demister (not shown) to ensure that any water mist or water droplets are not carried through to the pre-purification unit 35, which could adversely impact the air separation plant by deactivating the drying sieves in the pre-purification units.

The pre-purification unit 35 is an adsorptive based system configured to remove impurities such as water vapor, hydrocarbons, and carbon dioxide from the feed air stream. Although the pre-purification unit 35 is shown disposed downstream of the fourth compressor unit 29 of the common air compression train 20, it is contemplated that one can place the pre-purification unit 35 further upstream in the common air compression train 20. The pre-purification unit 35 generally consists of at least two vessels containing layers of different molecular sieves that are designed to remove the impurities from the compressed feed air stream 24. While one vessel is active in removing such contaminants and impurities, the other vessel and adsorbent beds disposed therein are being regenerated.

The regeneration process is a cyclic, multi-step process involving steps often referred to as blowdown, purge, and repressurization. Slowdown of the vessel involves releasing or changing the vessel pressure from the high feed pressure maintained during the active adsorptive process to a pressure close to ambient pressure levels. The adsorbent bed is then purged or regenerated at the lower pressure using a waste gas produced by the distillation column system. After regeneration, the purged/regenerated bed is repressurized from the near ambient pressure to the higher feed pressure by diverting a portion of the compressed feed air stream 32 from the main air compression train to the vessel until it is repressurized.

In addition to periodically diverting a portion of the compressed feed air stream 32 for purposes of pre-purification unit repressurization, there may be times where diversion of clean dry air from the common air compression train 20 downstream of the pre-purification unit is required for other portions of the plant or there may be times where venting a portion 36 of the compressed air stream 24 upstream of the pre-purification unit is required for the safe operation of the air separation plant 10 or to de-ice the air suction filter house. To that end, a repressurization circuit 33 and valve 34 as well as other diversion circuits or vent circuits 37 and associated valves 38 are shown in the figures.

Further compression of most or substantially all of the compressed and purified feed air stream 28 in one or more further compression stages disposed downstream of the pre-purification unit 35 may also be employed. Such downstream compressor units 39 or compression stages may be configured to be part of an integrally geared compressor 50 or may be yet another direct drive machine. As these compression stages 39 are disposed downstream of the pre-purification unit 35, they are generally considered part of the boosted air compression train, which is separate from the main air compression train, but as described herein, may remain part of the common air compression train 20. Use of intercoolers and/or aftercoolers 41 disposed between or after the compression stages serves to keep the further compressed and purified feed air stream at appropriate temperatures through the common air compression train 20.

The compressed, purified and cooled feed air stream 30 exiting the common air compression train 20 is then directed to a split functional air compression train 60 having one or more compression stages 65,67. However, rather than compressing the entire compressed, purified and cooled feed air stream 30, the split functional air compression train 60 divides the stream into two or more portions 62, 64. As seen in FIG. 1, one portion of the compressed and purified feed air stream is referred to as boiler air stream 62 that is optionally compressed in compressor unit 65 and the resulting further compressed stream 66 cooled in cooler 41 and fed to the primary heat exchanger 70 and used to boil liquid products produced by the air separation plant 10, such as liquid oxygen, to meet the gaseous product requirements. The cooled, compressed boiling air stream 66 is further cooled in the primary heat exchanger 70 via indirect heat exchange with the liquid oxygen stream to form a liquid air stream 72 at temperatures suitable for rectification in the distillation column system 80 of the cryogenic air separation plant 10. As seen in the Figures, the liquid air stream 72 is often split into two or more liquid air streams, 74, 75 with a first portion of the liquid air stream 74 directed to the higher pressure column 82 and another portion of the liquid air 75 being directed to the lower pressure column 84. Both liquid air streams 74, 75 are typically expanded using an expansion valves 76, 77 prior to introduction into the respective columns.

Another portion of the compressed and purified feed air stream is often referred to as a turbine air stream 64 that is optionally compressed in compressor unit 67 with the resulting further compressed stream 68 being partially cooled in the primary heat exchanger 70. The compressed and partially cooled turbine air stream 69 is then directed to a turbine air circuit 90 where it is turbo-expanded in a turbo-expander 71 to provide refrigeration to the cryogenic air separation plant 10, with the resulting exhaust stream 89 being directed to distillation column system 80 of the cryogenic air separation plant 10. The turbine air circuit 90 illustrated in FIG. 1 is shown as a lower column turbine (LCT) air circuit where the expanded exhaust stream 89 is fed to the higher pressure column 82 of the distillation column system 80. Alternatively, the turbine air circuit may be an upper column turbine (UCT) air circuit where the turbine exhaust stream is directed to the lower pressure column. Still further, the turbine air circuit may be a warm recycle turbine (WRT) air circuit where the turbine exhaust stream is recycled within a refrigeration loop coupled to the primary heat exchanger, or other variations of such known turbine air circuits such as a partial lower column turbine (PLCT) air circuit or a warm lower column turbine (WLCT) air circuit.

Each of the compression stages disposed downstream of the pre-purification unit 35 may be configured to be part of an integrally geared compressor (IGC) 50 or may be coupled to and driven by the shaft work of the turbo-expanders. In such cases, the compression stages preferably include a bypass circuit 55 and by-pass valve 57 the flow through which is controlled to prevent or mitigate unwanted conditions in the compression stage such as a surge condition, margin limit, stonewall condition or excessive vibration condition, etc.

As indicated above, one or more of the portions of the compressed and purified feed air stream 66, 68 in the split functional air compression train 60 are passed through the primary heat exchanger 70 and subsequently introduced or fed to the distillation column system 80 of the cryogenic air separation plant 10 where the air streams are separated to produce liquid products 92, 93; gaseous products, 94, 95, 96, 97; and waste streams, 98. As well known in the art, the distillation column system 80 is preferably a thermally integrated two-column or three column arrangement in which nitrogen is separated from the oxygen to produce oxygen and nitrogen-rich product streams. A third column or an argon column 88 can also be provided that receives an argon-rich stream from the lower pressure column 84 and separates the argon from the oxygen to produce an argon containing product 96. Oxygen that is separated from the feed air stream can be taken as a liquid product 92 that can be produced in the lower pressure column as an oxygen-rich liquid column bottoms 91. Liquid product 93 can additionally be taken from part of the nitrogen-rich liquid 99 used in refluxing one or more of the columns. As known in the art, the oxygen liquid product can be pumped via pump 85 and then taken, in part, as a pressurized liquid oxygen product 92, and also heated, in part, in the primary heat exchanger 70 against the boiler air stream 66 to produce a gaseous oxygen product 94 or as a supercritical fluid depending on the degree to which the oxygen is pressurized by the pumping. The liquid nitrogen can similarly be pumped and taken as either as pressurized liquid product, a high pressure vapor or a supercritical fluid.

In many regards, the embodiment illustrated in FIG. 2 is similar to the embodiment of FIG. 1 with one key difference, namely the lower pressure compression stage or compressor unit 17 is driven by a dedicated first variable speed electric motor 15. As with the above embodiments, the lower pressure compressor unit 17 may also include inlet guide vanes 21 to assist in the control of the incoming feed air stream flow through the common air compression train 20. The subsequent two compression stages in the common air compression train 20 arranged in series with the initial or lower pressure compression stage are driven by the second variable speed electric motor 25. Still further compression stages or compression units 39 of the common air compression train 20 as well as the compression stages or compression units 65, 67 in the split functional compression train 60 are preferably part of one or more integrally geared compressors (IGC) 50 or may be driven by the shaft work of the turbo-expanders. In this embodiment, the downstream compressor unit 39 of the common air compression train 20, as well as the additional intercooler 43 are situated upstream of the pre-purification unit 35.

Likewise, the embodiment illustrated in FIG. 3 is also similar to the embodiment of FIG. 1 with another key difference, namely there are two lower pressure compression stages or compressor units 17A, 17B arranged in parallel both driven by the first variable speed electric motor 15. The subsequent two compression stages or compressor units 27, 29 in the common air compression train 20 are driven by the second variable speed electric motor 25 and arranged in series with the two lower pressure compression stages. Still further compression stages or compressor units 39A, 39B of the common air compression train 20 as well as any optional compression stages in the split functional compression train (not shown) are preferably part of one or more integrally geared compressors (IGC) 50 or may be driven by the shaft work of the turbo-expanders. As shown in FIG. 3, the two lower pressure compression stages 17A, 17B preferably have a common air feed 11 through which the two centrifugal compressor stages 17A,17B are fed with ambient pressure filtered air 12 and a common outlet 18 from which the compressed air is discharged as a first compressed air stream 14. The first centrifugal compressor stage 17A is preferably mounted on one end of a motor shaft of the variable speed electric motor 15 while the second centrifugal compressor stage 17B is mounted on the other end of the motor shaft. Neither, either or both of the first and the second centrifugal compressors have inlet guide vanes 21. Alternatively, this arrangement may be configured such that each of the two lower pressure compression stages each receive and compress different volumetric flows of ambient pressure air. Such alternative arrangement may provide certain operational and cost advantages during turndown of the air separation plant 10.

Figure 4:
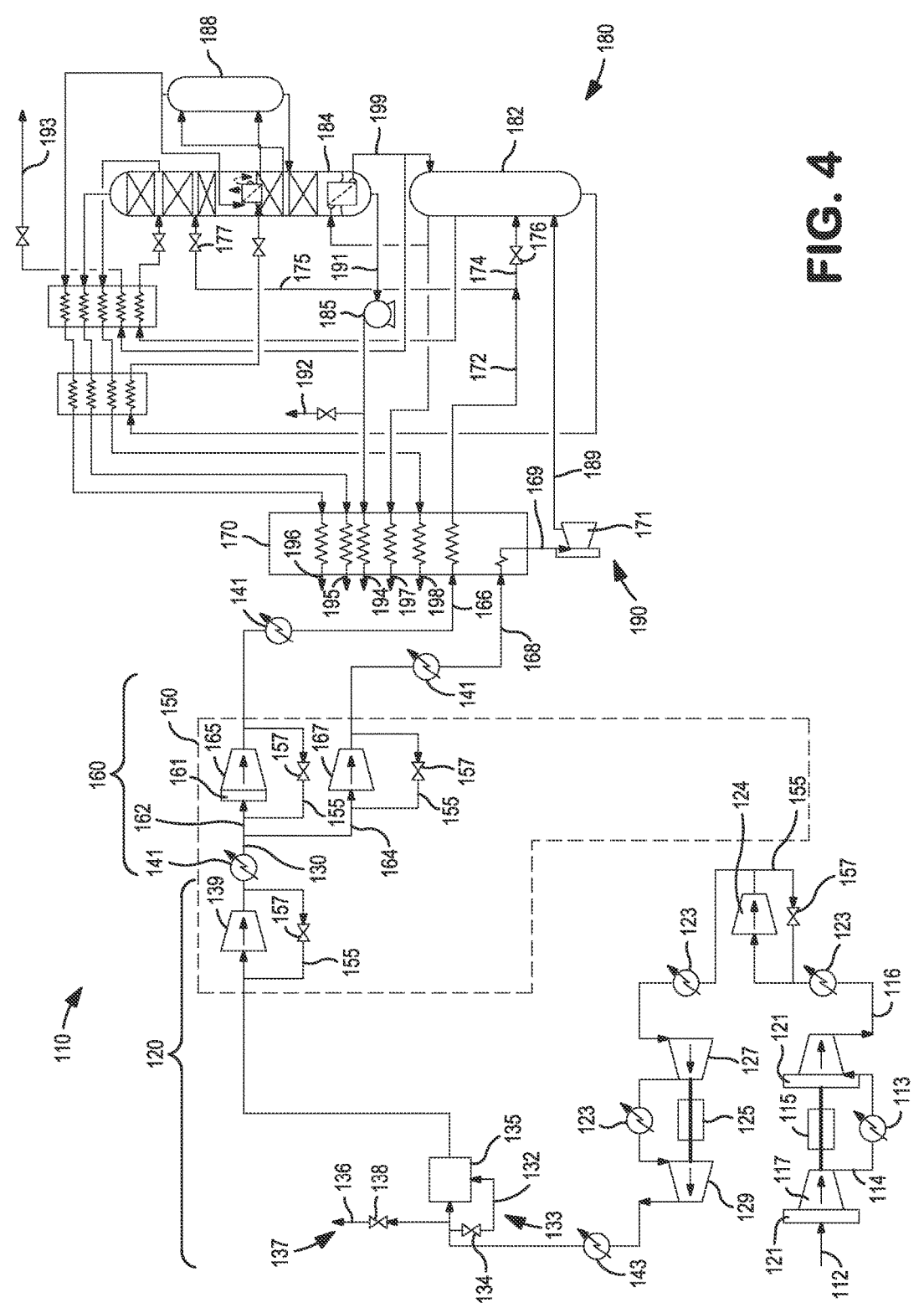

Turning now to FIG. 4, there is shown a schematic flow diagram of a cryogenic air separation plant 110 employing another variant of the common air compression train 120 having two or more variable speed drive assemblies 115, 125. As with the earlier described embodiments, the incoming feed air stream 112 is filtered and then compressed in the lower pressure compressor unit or stage 117 of the compression arrangement, which forms the initial compression stage of the common air compression train 120 to produce a first compressed air stream 114. The lower pressure compressor unit or stage 117 is driven directly by a first variable speed drive assembly, shown as a first high speed and variable speed electric motor 115. The first compressed air stream 117 is cooled in intercooler 113 and directed to a second compressor unit or stage 119 of the compression arrangement, which forms the second compression stage of the common air compression train 120 which is also driven directly by the first variable speed electric motor 115 to produce a second compressed air stream 116. Neither, either or both of the first compressor unit/stage 117 and the second compressor unit/stage 119 may have inlet guide vanes 121 to assist in the control of the common air compression train 120.

Figure 5:
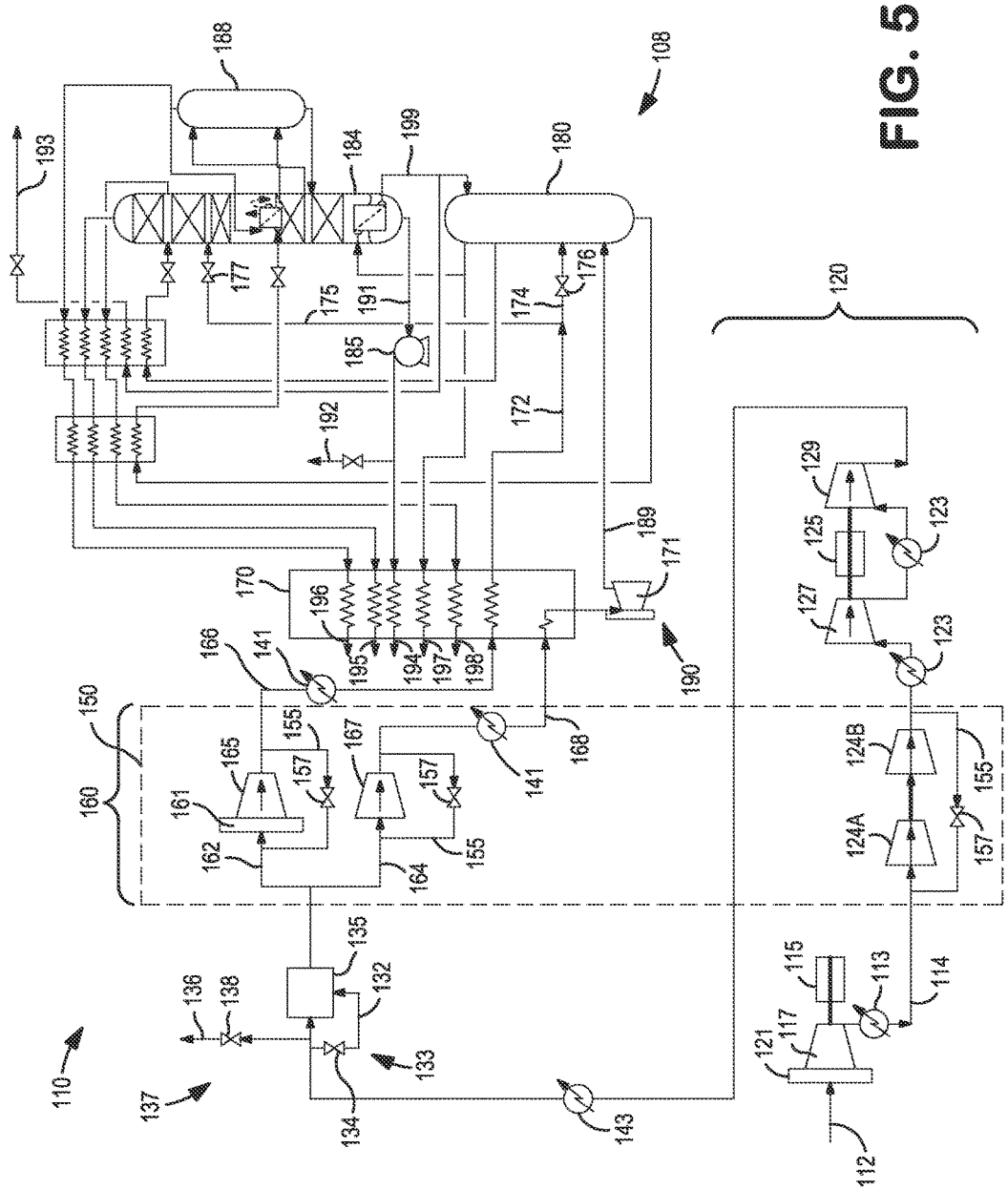
FIG. 5 is a schematic flow diagram of a cryogenic air separation plant incorporating another alternative arrangement for the compression of an incoming feed air stream in a cryogenic air separation plant in accordance with the present invention.
Figure 6:
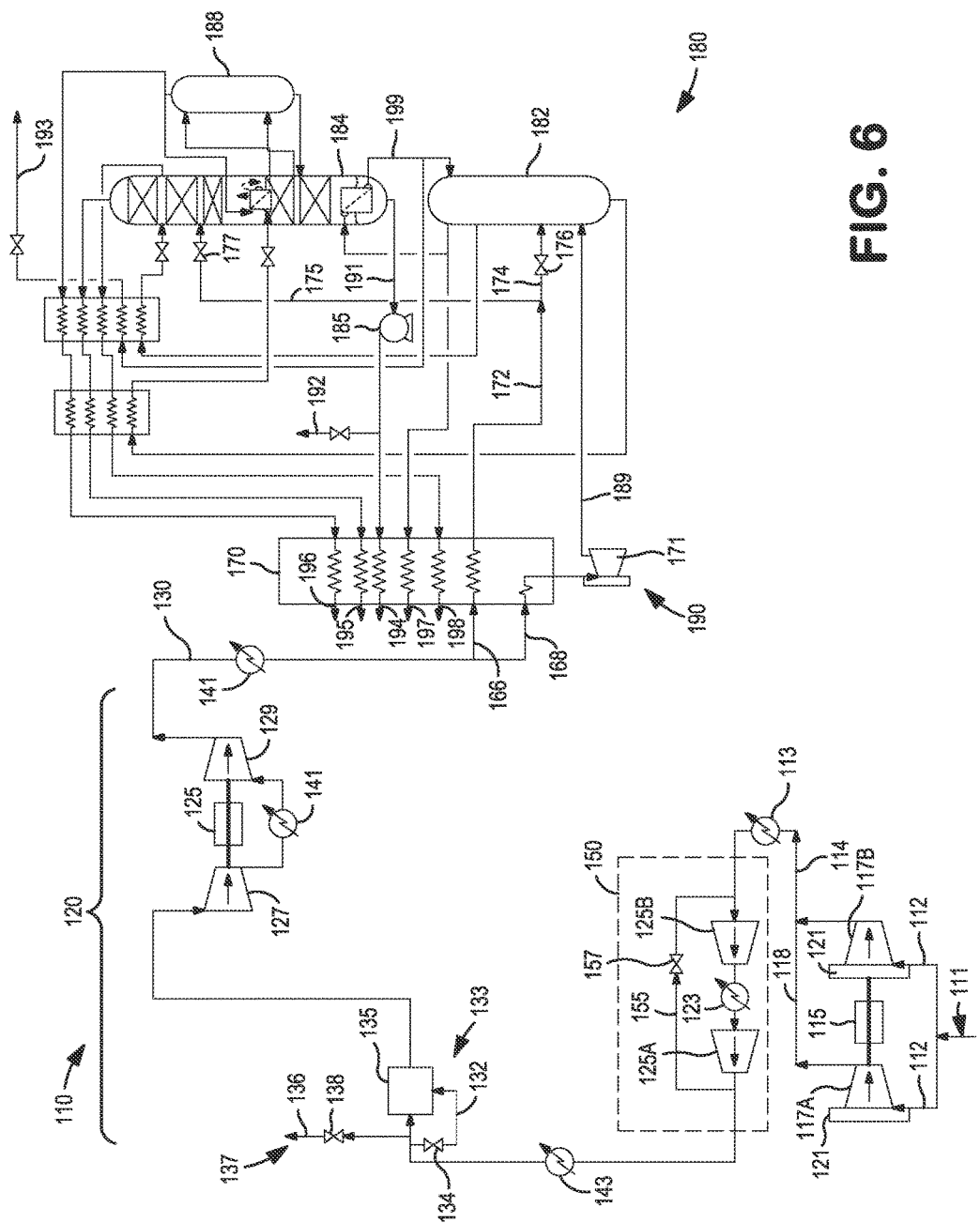
FIG. 6 is a schematic flow diagram of a cryogenic air separation plant incorporating yet another alternative arrangement for the compression of an incoming feed air stream in a cryogenic air separation plant in accordance with the present invention.

In the embodiments shown in FIGS. 4-6, the second compressed air stream 116 is again cooled in intercooler 123 and directed to one or more intermediate compression stages in the form of an additional compressor units/stages 124. Unlike the lower pressure compressor units 117, 119, these additional compressor units/stages 124 need not be driven by a variable speed drive assembly, but rather, more preferably are part of an integrally geared compressor (IGC) 150. However, the later compression stages of the common air compression train 120 include one or more higher pressure compression stages 127, 129 are driven by a second high speed, variable speed electric motor 125.

Similar to the earlier described embodiments, the embodiments shown in FIGS. 4-6 also include a pre-purification unit 135, a plurality of intercoolers 123, aftercoolers 143 in the common air compression train 120 as well as any required bypass circuits 155, bypass valves 157, diversion or vent streams 136 and circuits 137, and repressurization streams 132 and circuits 133 and associated valves 134, 138 that function in a manner described with reference to FIGS. 1-3. The embodiments further include a primary heat exchanger 170 and a two column or three column distillation column system 180 (including an optional argon column 188 configured to produce an argon containing product 196) where the purified air streams are separated to produce liquid products 192, 193; gaseous products, 194, 195, 196, 197; and waste streams, 198. Oxygen that is separated from the incoming air feed can be taken as a liquid product 192 that can be produced in the lower pressure column as an oxygen-rich liquid column bottoms 191. Liquid product 193 can additionally be taken from part of the nitrogen-rich liquid 199 used in refluxing one or more of the columns. The oxygen liquid product can be pumped via pump 185 and then in part taken as a pressurized liquid product 192, and also heated in the primary heat exchanger 170 against the boiler air stream 166 to produce a gaseous oxygen product 194.

The compressed, purified and cooled feed air stream 130 exiting the common air compression train 120 in FIGS. 4-6 is then directed to a split functional air compression train 160 having and one or more compression stages or compressor units 165, 167. However, rather than compressing the entire compressed, purified and cooled feed air stream 130, the split functional air compression train 160 divides the stream 130 into two or more portions 162, 164. As seen in the drawings, one portion of the compressed and purified feed air stream is referred to as boiler air stream 166 that is compressed in compressor unit 165, cooled in cooler 141 and fed to the primary heat exchanger 170 where it is used to boil liquid oxygen products to meet the gaseous oxygen product requirements of the plant 110. The boiling air stream 166 portion of the feed air stream is sufficiently cooled in the primary heat exchanger 170 via indirect heat exchange with the pumped liquid oxygen stream 191 to form a liquid air stream 172 at temperatures suitable for rectification in the distillation column system 180 of the cryogenic air separation plant 110. The liquid air stream 172 is often split into two or more liquid air streams with a portion of the liquid air stream 174 directed to the higher pressure column 182 and another portion of the liquid air stream 175 being directed to the lower pressure column 184. Both liquid air streams 174, 175 are typically expanded using an expansion valves 176, 177 prior to introduction into the respective columns.

Another portion of the compressed and purified feed air stream is often referred to as a turbine air stream 168 that is optionally compressed in compressor unit 167 and partially cooled in the primary heat exchanger 170. The partially cooled and compressed turbine air stream 169 is directed to a turbine air circuit 190 where it is expanded in turbo-expander 171 to provide refrigeration to the cryogenic air separation plant 110, with the resulting exhaust stream 189 being directed to distillation column system 180 of the cryogenic air separation plant 110. The turbine air circuit 190 illustrated in FIG. 4 is shown as a lower column turbine (LCT) air circuit where the expanded exhaust stream 189 is fed to the higher pressure column 182 of the distillation column system 180. However, as described above, the turbine air circuit may be an upper column turbine (UCT) air circuit where the turbine exhaust stream is directed to the lower pressure column, a warm recycle turbine (WRT) air circuit where the turbine exhaust stream is recycled within a refrigeration loop coupled to the primary heat exchanger, or variations of such known turbine air circuits such as a partial lower column turbine (PLCT) air circuit or a warm lower column turbine (WLCT) air circuit.

In many regards, the embodiment illustrated in FIG. 5 is similar to the embodiment of FIG. 4 but where the lower pressure compression stage or compressor unit 117 is driven by a dedicated first variable speed electric motor 115. As with the above embodiments, the lower pressure compressor unit 117 may also include inlet guide vanes 121 to assist in the control of the incoming feed air stream flow through the common air compression train 120. The subsequent two intermediate pressure compression stages 125A, 125B in the common air compression train 120 arranged in series with the initial or lower pressure compression stage 117 or stages and are preferably part of one or more integrally geared compressors (IGC) 150 whereas one or two of the later higher pressure compression stages 127, 129 of the common air compression train 120 are driven by the second variable speed electric motor 125 in either a single ended configuration (i.e. one higher pressure compression stage) or double ended configuration (i.e. two higher pressure compression stages). Any downstream compression stages 165, 167 in the split functional compression train 160 are also preferably part of one or more integrally geared compressors (IGC) 150 or may be driven by the shaft work of the above-described turbo-expanders.

Likewise, the embodiment illustrated in FIG. 6 is also similar to the embodiment of FIG. 4 with two lower pressure compression stages 117A, 117B arranged in parallel that are both driven by the first variable speed electric motor 115. The subsequent two intermediate pressure compression stages 125A, 125B in the common air compression train 120 are preferably part of one or more integrally geared compressors (IGC) 150 whereas the one or two later higher pressure compression stages 127, 129 of the common air compression train 120 are located downstream of the pre-purifier unit 135 and driven by the second variable speed electric motor 125 in either a single ended configuration (i.e. one higher pressure compression stage) or double ended configuration (i.e. two higher pressure compression stages). In this embodiment, the two lower pressure compression stages comprise two centrifugal compressors or compression units/stages 117A, 117B preferably have a common air feed 111 through which the two centrifugal compressors are fed with ambient pressure air 112 and a common outlet 118 from which the compressed air 114 is discharged. The first centrifugal compressor unit/stage 117A is preferably mounted on one end of the motor shaft of the first variable speed electric motor 115 while the second centrifugal compressor unit/stage 117B is mounted on the other end of the motor shaft. Neither, either or both of the first and the second centrifugal compressors may have inlet guide vanes 121.

Figure 7:
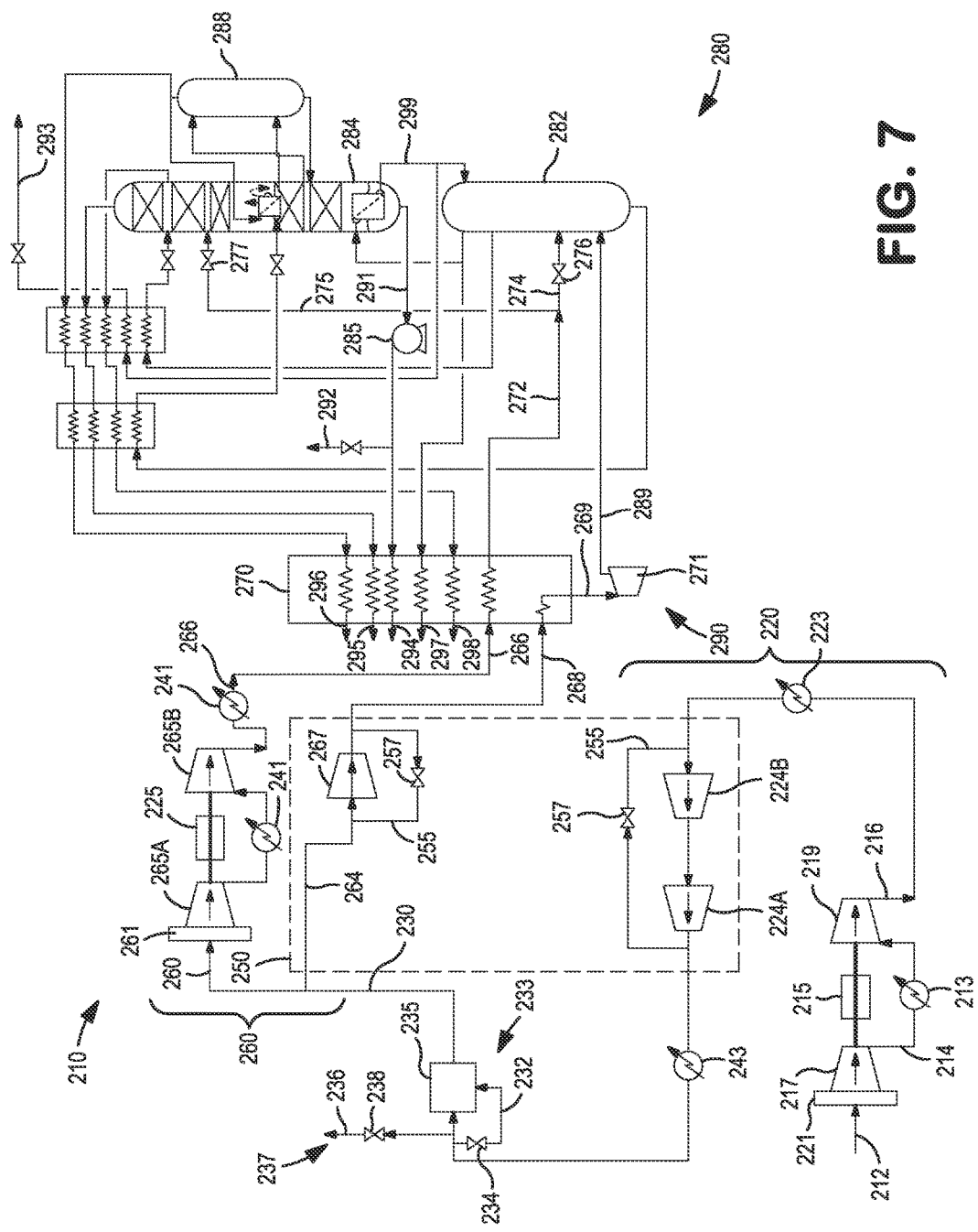
FIG. 7 is a schematic flow diagram of a cryogenic air separation plant incorporating a third alternative arrangement for the compression of an incoming feed air stream in a cryogenic air separation plant in accordance with the present invention.

Turning now to FIG. 7, there is shown a schematic flow diagram of a cryogenic air separation plant 210 employing a third variant of the air separation compression train having two or more variable speed drive assemblies 215, 225. As with the earlier described embodiments, the incoming feed air stream 212 is compressed in the lower pressure compressor unit 217 of the compression arrangement, which forms the initial compression stage of the common air compression train 220 to produce a first compressed air stream 214. The lower pressure compressor unit 217 is driven directly by the first variable speed drive assembly, shown as a first high speed and variable speed electric motor 215. The compressed air stream 214 is cooled in intercooler 213 and directed to a second compressor unit 219 of the compression arrangement, which forms the second compression stage of the common air compression train 220 which is also driven directly by the first variable speed electric motor 215 to produce a second compressed air stream 216. Neither, either or both of the first compressor unit 217 and the second compressor unit 219 may have inlet guide vanes 221 to assist in the control of the common air compression train 220.

The remaining compression stages of the common air compression train 220 including one or more intermediate pressure compression stages 224A, 224B and one or more higher pressure compression stages need not be driven by a variable speed drive assembly, but rather, more preferably are part of an integrally geared compressor (IGC) 250. Similar to the earlier described embodiments, the embodiments shown in FIGS. 7-9 also include a pre-purification unit 235, a plurality of intercoolers 223, aftercoolers 243 in the common air compression train 220 as well as any required bypass circuits 255, bypass valves 257, diversion or vent streams 236 and circuits 237, and repressurization streams 232 and circuits 233 and associated valves 234, 238 that function in a manner described above with reference to FIGS. 1-3. The embodiments further include a primary heat exchanger 270 and a two column or three column distillation column system 280 (including an optional argon column 288 configured to produce an argon containing product 296) where the purified air streams are separated to produce liquid products 292, 293; gaseous products, 294, 295, 296; and waste streams, 297, 298. Oxygen that is separated from the incoming air feed can be taken as a liquid product 292 that can be produced in lower pressure column 284 as an oxygen-rich liquid column bottoms 291. Liquid product 293 can additionally be taken from part of the nitrogen-rich liquid 299 used in refluxing one or more of the columns. The oxygen liquid product can be pumped via pump 285 and then in part taken as a pressurized liquid product 292, and also heated in the primary heat exchanger 270 against the boiler air stream 266 to produce a gaseous oxygen product 294.

Figure 8:
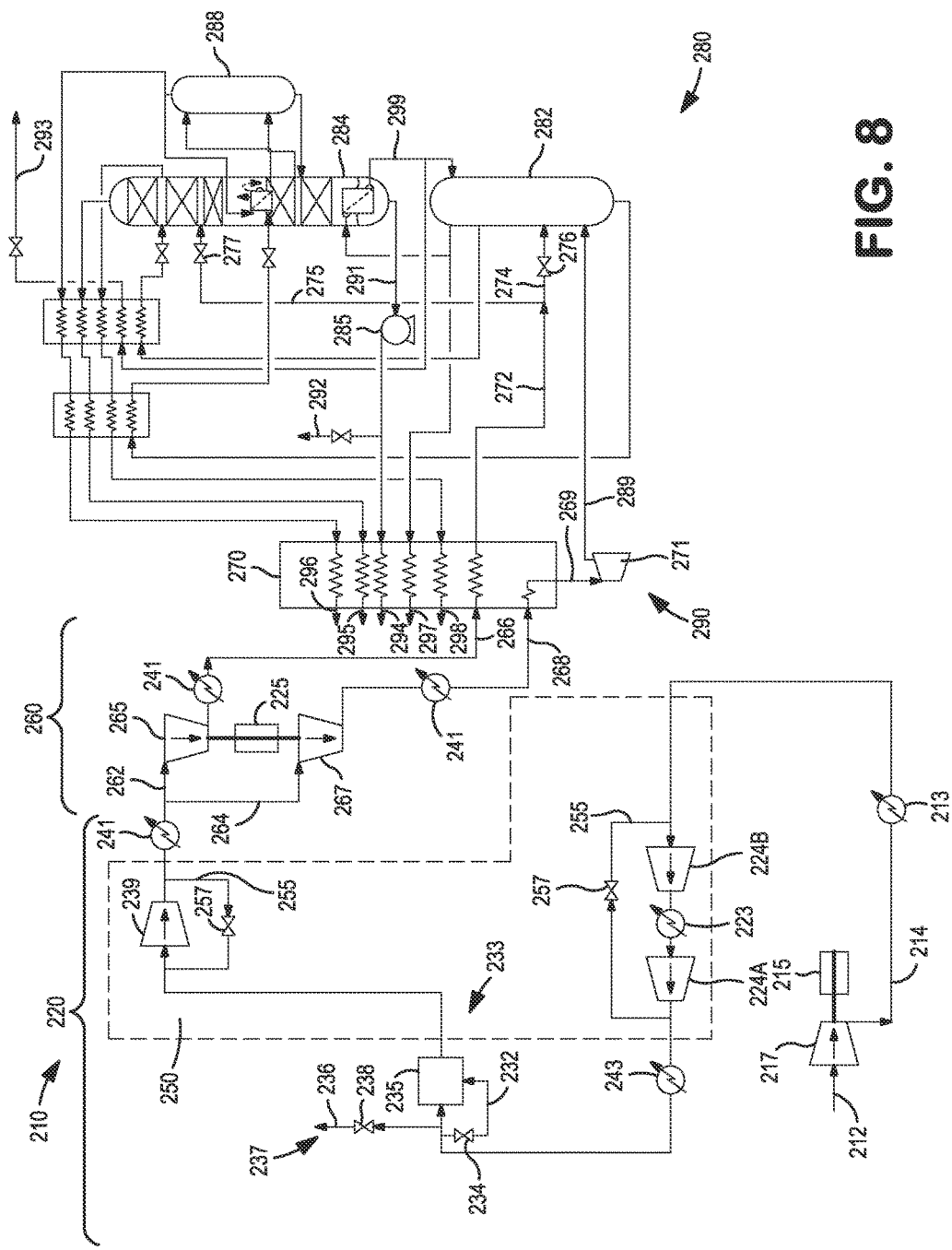
FIG. 8 is a schematic flow diagram of a cryogenic air separation plant incorporating another variant of the third alternative arrangement for the compression of an incoming feed air stream in a cryogenic air separation plant in accordance with the present invention.
Figure 9:
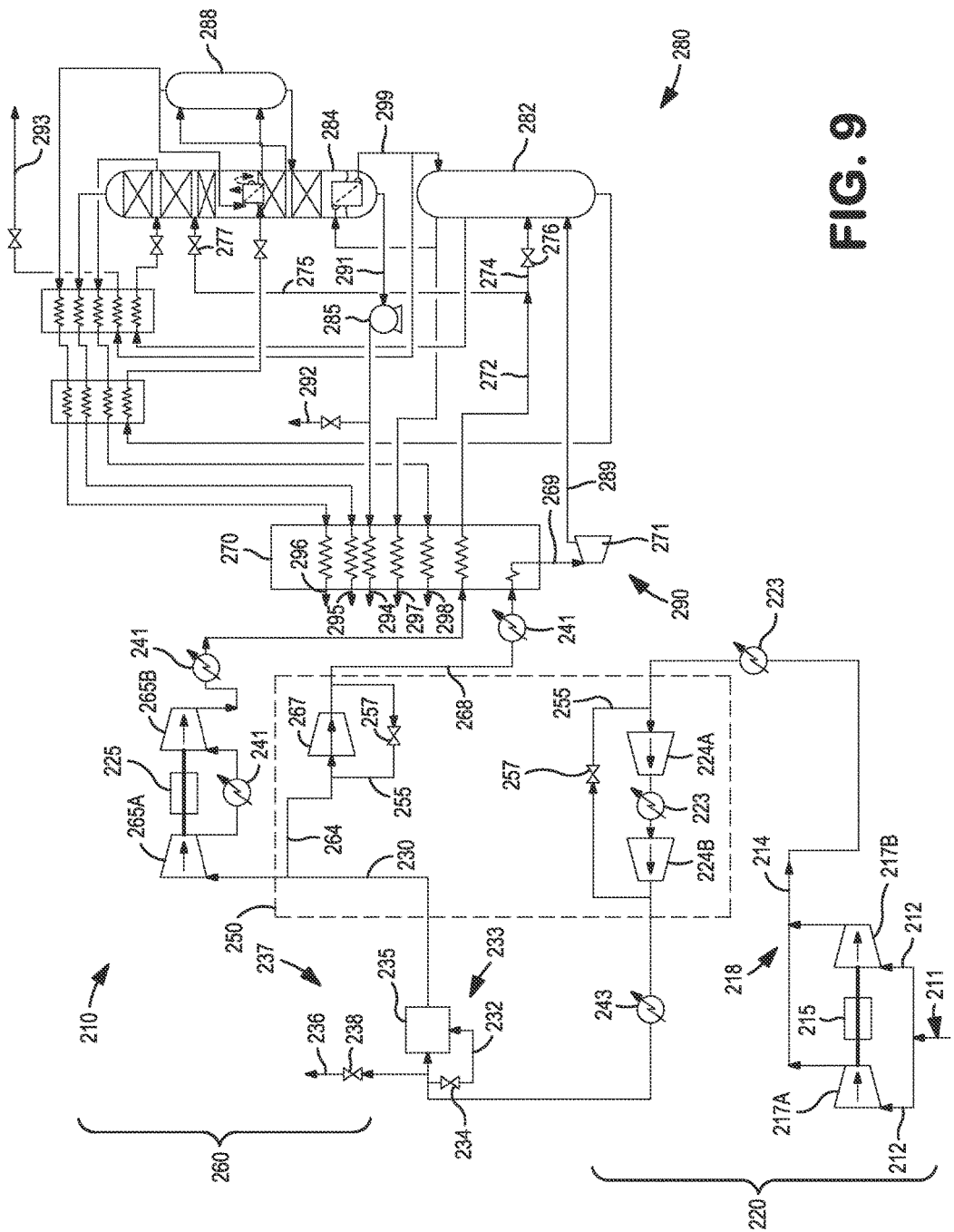
FIG. 9 is a schematic flow diagram of a cryogenic air separation plant incorporating yet another variant of the third alternative arrangement for the compression of an incoming feed air stream in a cryogenic air separation plant in accordance with the present invention.

The compressed, purified and cooled feed air stream exiting the common air compression train 220 in FIGS. 7-9 is then directed to a split functional air compression train 260. Specifically, the split functional air compression train 260 divides the compressed and purified air stream into two or more portions. As seen in FIG. 7, one portion of the compressed and purified feed air stream is referred to as boiler air stream 266 that is still further compressed in a one or two boiler air compressor units 265A, 265B that includes one or more higher pressure compression stages driven by the second variable speed drive assembly or, more particularly, the second high speed, variable speed electric motor 225. The second variable speed drive assembly 225 may be configured as a single ended arrangement (i.e. one higher pressure boiler air compression stage 265A) or double ended arrangement (i.e. two higher pressure boiler air compression stages 265A, 265B).

The further compressed boiler air stream portion 266 is fed to the primary heat exchanger 270 and used to boil liquid oxygen to meet the gaseous oxygen product requirements of the air separation plant 210. The boiling air stream portion 266 of the feed air stream is sufficiently cooled in the primary heat exchanger 270 via indirect heat exchange with the liquid oxygen stream to form a liquid air stream 272 at temperatures suitable for rectification in the distillation column system 280 of the cryogenic air separation plant 210. The liquid air stream 272 is often split into two or more liquid air streams with a portion of the liquid air stream 274 directed to the higher pressure column 282 and another portion of the liquid air stream 275 being directed to the lower pressure column 284. Both liquid air streams 274, 275 are typically expanded using an expansion valves 176, 277 prior to introduction into the respective columns.

Another portion of the compressed and purified feed air stream is often referred to as a turbine air stream 268 that is optionally compressed in compressor unit 267 and partially cooled in the primary heat exchanger 270. If further compressed, the turbine air compression stages 267 are preferably part of an integrally geared compressor (IGC) 250 or may be coupled to and driven by the shaft work of the turbo-expanders.

The partially cooled turbine air stream 269 is directed to a turbine air circuit 290 where it is expanded using turbo-expander 271 to provide refrigeration to the cryogenic air separation plant 210, with the resulting exhaust stream 295 being directed to distillation column system 280 of the cryogenic air separation plant 210. The turbine air circuits 290 illustrated in FIGS. 7-9 are shown as lower column turbine (LCT) air circuits where the expanded exhaust stream 295 is fed to the higher pressure column 282 of the distillation column system 280. Alternatively, the turbine air circuits may be upper column turbine (UCT) air circuits where the turbine exhaust stream is directed to the lower pressure column, warm recycle turbine (WRT) air circuits where the turbine exhaust stream is recycled within a refrigeration loop coupled to the primary heat exchanger, or variations of such known turbine air circuits such as partial lower column turbine (PLCT) air circuits or warm lower column turbine (WLCT) air circuits.

The embodiment illustrated in FIG. 8 is similar to the embodiment of FIG. 7 but where the lower pressure compression stage or compressor unit 217 is driven by the dedicated first variable speed electric motor 215. As described above, the lower pressure compressor unit 217 may also include inlet guide vanes to assist in the control of the incoming feed air stream flow through the common air compression train 220. The subsequent intermediate pressure compression stages 224A, 224B and higher pressure compression stages 239 in the common air compression train 220 are arranged in series with the initial or lower pressure compression stage 217 and are preferably part of one or more integrally geared compressors (IGC) 250. Alternatively, one or more of the intermediate pressure compression stages and higher pressure compression stages may be coupled to and driven by the shaft work of the turbo-expanders.

In the embodiment of FIG. 8, the boiler air stream 262 portion of the compressed and purified feed air stream is further compressed in a boiler air compressor unit 265 driven by the second high speed, variable speed electric motor 225. In addition one or more turbine air compressors 267 may be coupled to and driven by the second variable speed drive assembly 225. The second variable speed drive assembly 225 is configured either as a single ended configuration (i.e. for a boiler air compression stage 265 only) or a double ended configuration (i.e. for the boiler air compression stage 265 and a turbine air compression stage 267).

Likewise, the embodiment illustrated in FIG. 9 is also similar to the embodiment of FIG. 7 with two lower pressure compression stages 217A, 217B arranged in parallel that are both driven by the first variable speed electric motor 215. The subsequent intermediate pressure compression stages 224A, 224B and higher pressure compression stages (if any) in the common air compression train 220 are arranged in series with the initial or lower pressure compression stages 217A, 217B and are preferably part of one or more integrally geared compressors (IGC) 250. Alternatively, one or more of the intermediate pressure compression stages and higher pressure compression stages may be coupled to and driven by the shaft work of the turbo-expanders. In this embodiment of FIG. 9, the two lower pressure compression stages 217A, 217B comprise two centrifugal compressors or compression units preferably have a common air feed 211 through which the two centrifugal compressors are fed with ambient pressure air 212 and a common outlet 218 from which the compressed air 214 is discharged. The first centrifugal compressor 217A is preferably mounted on one end of the motor shaft of the first variable speed electric motor while the second centrifugal compressor 217B is mounted on the other end of the motor shaft. Either or both of the first and the second centrifugal compressors may have inlet guide vanes 221.

Further, all or part of the boiler air stream portion 266 of the compressed and purified feed air stream in the split functional air compression train 260 is further compressed in one or two boiler air compressors driven by the second high speed, variable speed electric motor 225. The boiler air compressors 265A, 265B may be coupled to and driven by the second variable speed electric motor 225 in a single ended configuration (i.e. for one boiler air compression stage) or in a double ended configuration (i.e. for two boiler air compression stages). In lieu of driving the boiler air compressors with the second variable speed electric motor, an alternative arrangement similar to that shown in FIGS. 7-9 is contemplated using two turbine air compressors arranged in parallel or in series are coupled to and driven by the second variable speed electric motor.

Compression Train Control

Figure 10:
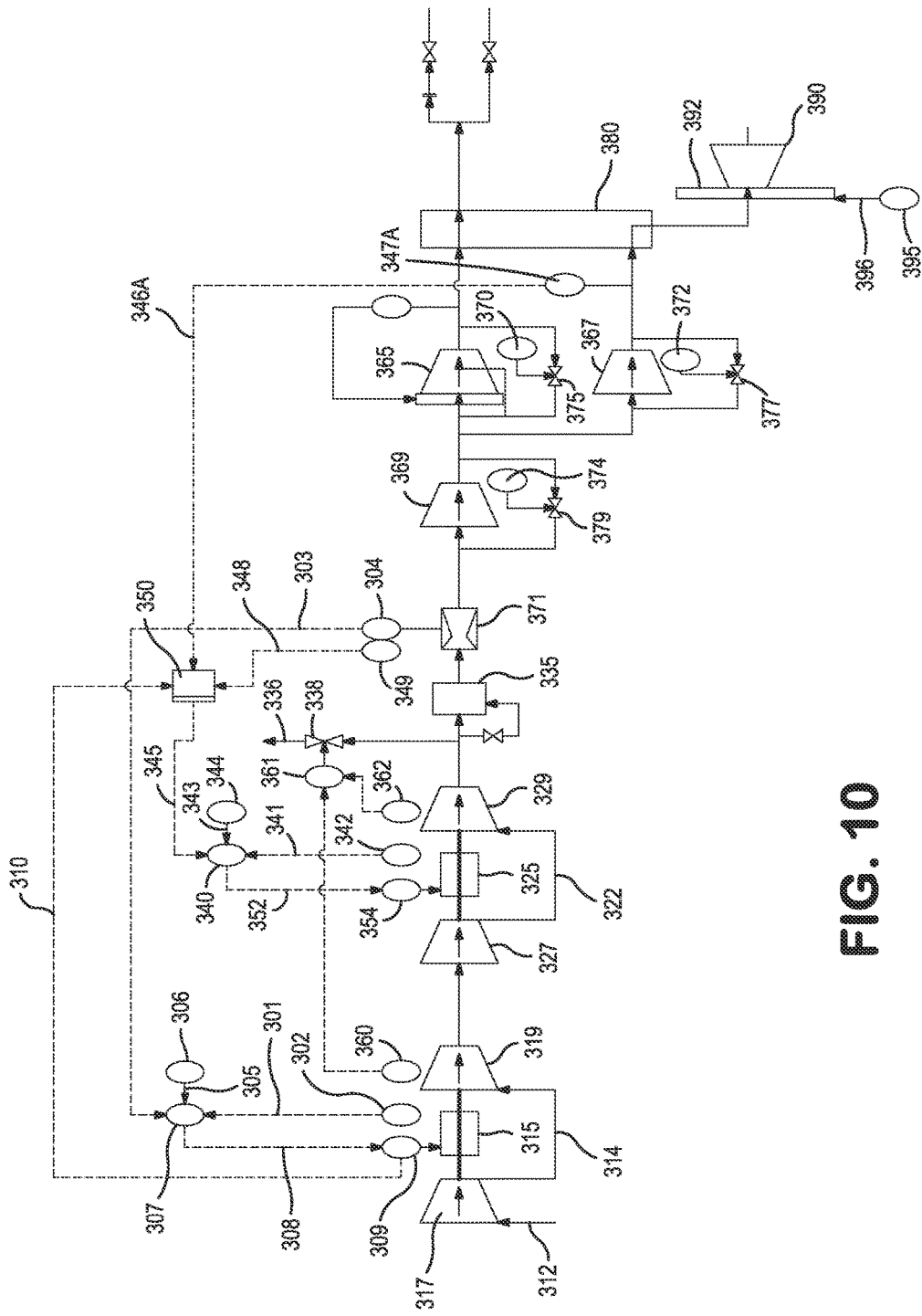
FIG. 10 is a schematic flow diagram of an air compression trains in a cryogenic air separation plant illustrating aspects and features for the control of the air compression trains in accordance with the present invention.
Figure 11:
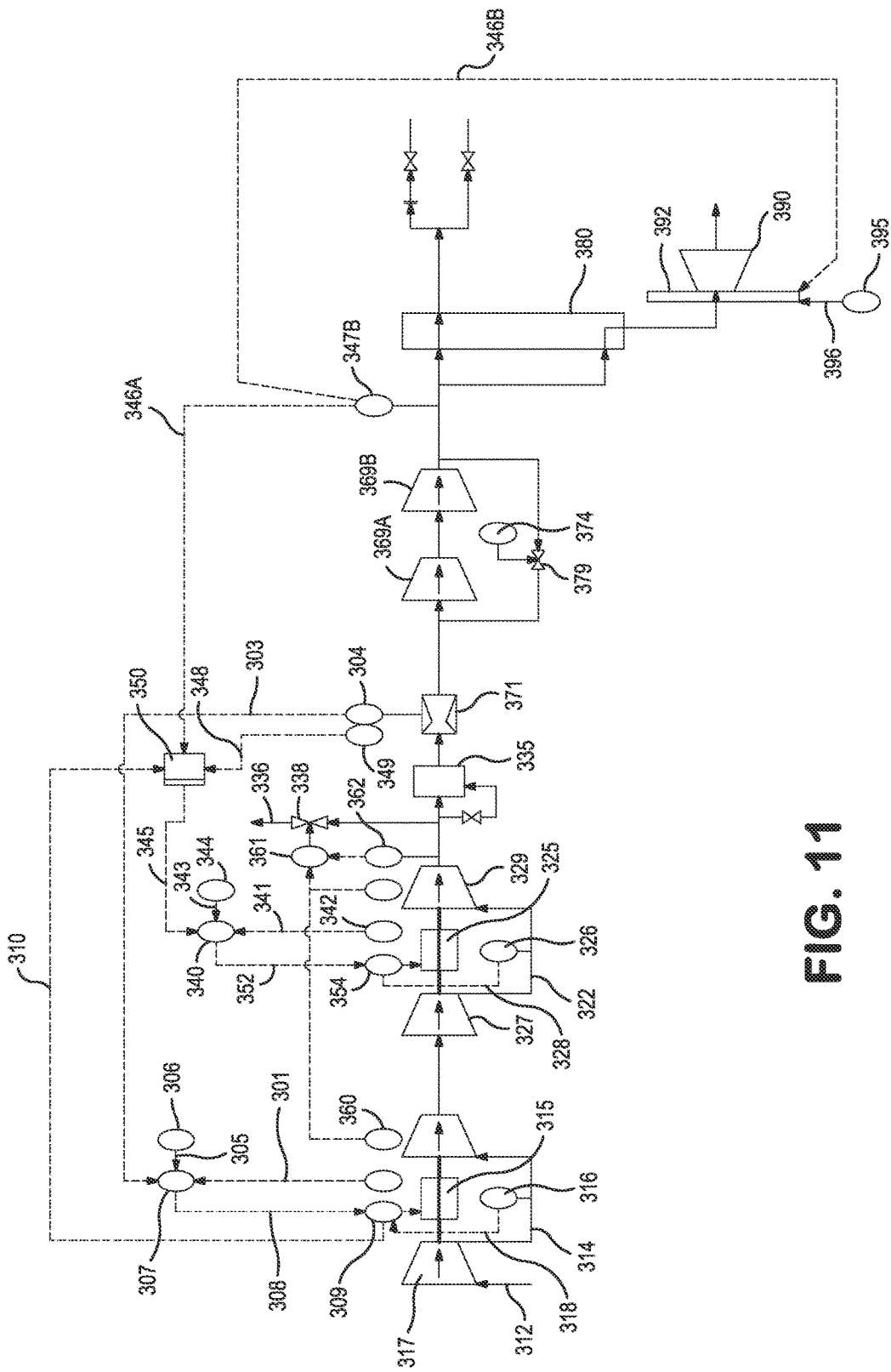
FIG. 11 is a schematic flow diagram of an air compression train in a cryogenic air separation plant illustrating further aspects and features for the control of such air compression trains in accordance with the present invention.
Figure 12:
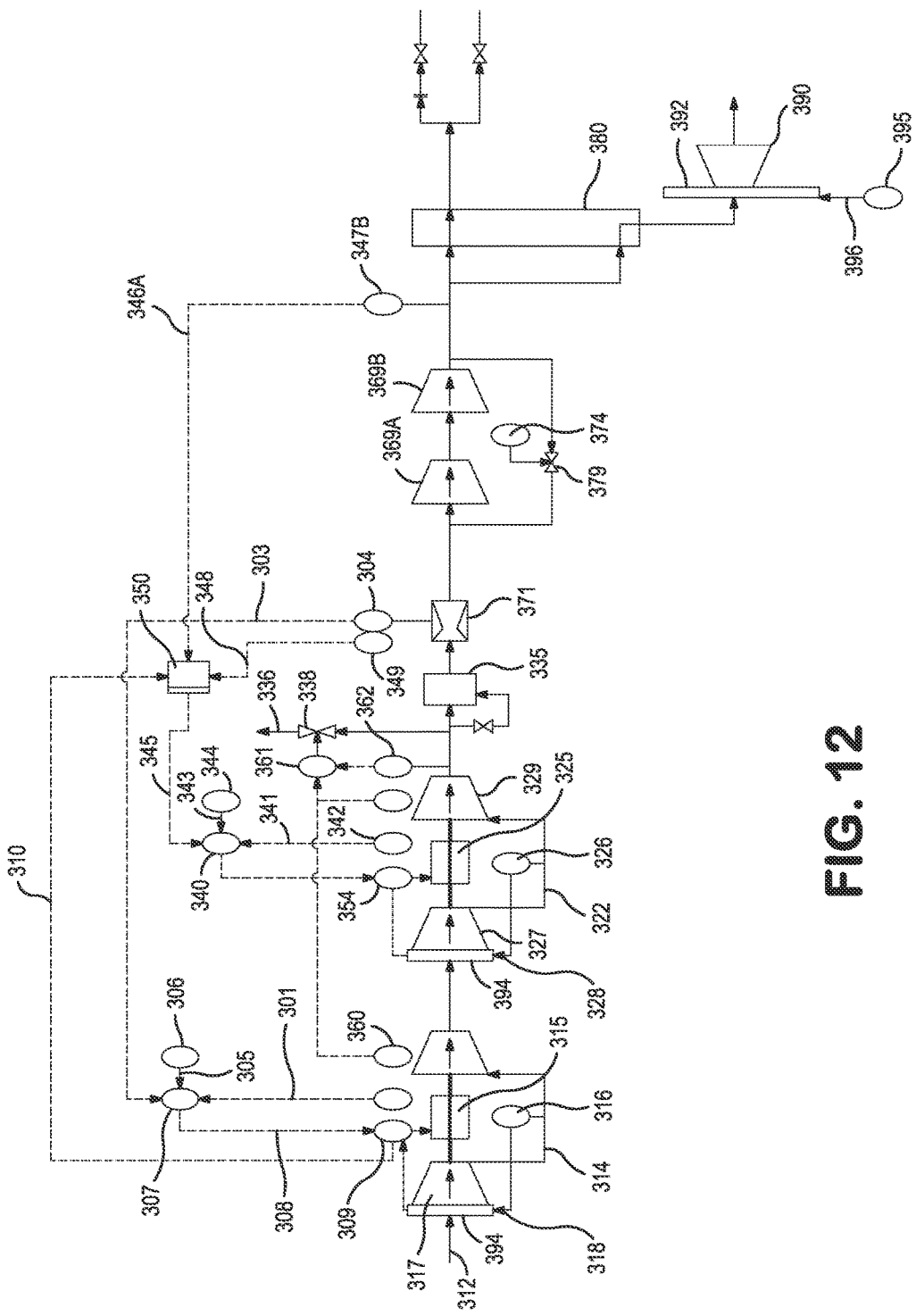
FIG. 12 is a schematic flow diagram of an air compression train in a cryogenic air separation plant illustrating yet further aspects and features for the control of such air compression trains in accordance with the present invention.

From a compression train control standpoint, FIGS. 10-12 depict embodiments of the air compression train within an air separation plant showing the control features associated with the various components of the air compression trains. As seen therein, the speed of the first variable speed motor 315 is a control parameter that is set and/or adjusted based on a first command signal 301 corresponding to the first motor assembly limits (JIC) 302, a command second signal 303 via the flow indicated control (FIC) 304 corresponding to the measured flow rate of air in the common air compression train as measured using a flow measurement device 371, and a third command signal 305 corresponding to any manual indicated controls (HIC) 306 or overrides from the plant operator. A selector 307, such as a low selector (<), compares the three command signals and selects the appropriate input 308 to the drive assembly to set and/or adjust the speed for the first variable speed electric motor 315 to compress the incoming feed air stream 312. Similarly, the speed of the second variable speed motor 325 is a control parameter that is set and/or adjusted based on a command signal 341 corresponding to the second motor assembly limits via the equipment indicated controller (JIC) 342, any manual indicated controller (HIC) 344 or overrides from the plant operator and a third command signal 345 produced by a controller 350 that is based on the signal 310 corresponding to the speed of the first variable speed electric motor 315, a signal 346A corresponding to the measured discharge pressure in the air compression train via the pressure indicated controller (PIC) 347A, 347B, and a signal 348 corresponding to the measured flow rate of air in the common air compression train via the flow indicated control (FIC) 349. A selector 340, such as a low selector (<), compares the three command signals 341, 343, 345, and selects the appropriate input 352 to the drive assembly to set and/or adjust the speed 354 for the second variable speed electric motor 325. In the illustrated embodiments, the measured discharge pressure in the air compression train is a measured pressure in the turbine air circuit of the split function air compression train via the pressure indicated controller (PIC) 347A or 347B situated upstream of the primary heat exchanger 380 and turbo-expander 390. Alternative pressure indicated controls may be in the boiler air circuit of the split function air compression train or at various locations in the common air compression train. For example, use of pressure indicated controllers for intermediate discharge pressures from each pair of commonly driven compression stages or intermediate discharge pressures from each individual stage may be used to limit the speeds of either or both variable speed motors. Such pressure indicated controls or other manual indicated controls may also be used to control other aspects of the air compression train in conjunction with the above-described control methods such as control of turbine nozzles 392 associated with one or more turbo-expanders or control of inlet guide vanes 394 associated with any compressor units in the common air compression train or split function air compression train.

For example, pressure indicated controls 316 corresponding to the pressure of the compressed air stream 314 between compression stages driven by the first variable speed motor 315 may be used as an input to control the speed of the first variable speed motor 315 (See FIG. 11) or used to control the inlet guide vanes 394 of the associated compressor units 317, 319 (See FIG. 12). Likewise, pressure indicated controls 326 corresponding to the pressure of the compressed air stream 322 between compression stages driven by the second variable speed motor 325 may be used as inputs 318, 328 to control the speed of the first variable speed motor 315 and the second variable speed motor 325, respectively (See FIG. 11) or used to control the inlet guide vanes 394 of the associated compressor units 327, 329. (See FIG. 12). Also, manual indicated control 395 and/or pressure indicated controller 347B can be used to control the turbine nozzle 392 position via signals 396 and 346B respectively, as the desired position is preferably correlated with the discharge pressures in the common air compression train and/or the split functional air compression train (see FIG. 11).

Surge indicated controllers (UIC) 360, 362, are also associated with each of the first and second variable speed drive assemblies, and more specifically with one or more of the compressor units 317, 319, 327, and 329 driven by the variable speed drive assemblies. The surge indicated controllers (UIC) 360, 362 preferably use some form of flow measurement and pressure to estimate surge or the on-set of a surge condition. To prevent the surge condition, the surge indicated controllers (UIC) 360, 362 are directed to a selector 361 that opens the vent 338 to discharge a portion of the compressed air 336 as to avoid the surge condition in one or more of the compressor units driven by the variable speed drive assemblies. Similar surge indicated controllers (UIC) 370, 372, 374 may also be used in operative association with other compression stages or compressor units 365, 367, 369 both in the common air compression train as well as in the split functional air compression train. To prevent the surge condition in those downstream compressor units 365, 367, 369, the surge indicated controllers (UIC) 370, 372, 374 open bypass valves 375, 377, 379 associated with respective compressor unit so as to avoid the surge condition.

As illustrated, the preferred compression train control involves adjusting the speed of the second variable speed drive assembly based, in part, on the speed of the first variable speed drive assembly. In addition to or in lieu of basing the speed control of the variable speed motors on the motor assembly limits, another control option is to control the speed of the first variable speed drive assembly in response to the measured flow rate of air in the common air compression train and one or more plant process limits, compressor limits, or other drive assembly limits. The speed of the second variable speed drive assembly would also be set or adjusted in response to similar plant process limits, compressor limits, or other drive assembly limits in conjunction with the speed of the first variable speed drive assembly.

Other external constraints or equipment constraints may also be integrated into the air compression train control. For example, if the first variable speed motor encounters a constraint, such as speed constraint, then the speed of the second variable speed motor can be adjusted to maintain the desired air flowrate through the common air compression train in addition to or in lieu of its' default control variable. Other constraints that would require the second variable speed motor to control flowrate include surge conditions, surge margin, stonewall conditions, pressure, torque, power, etc.

Put another way, during normal operations the second variable speed electric motor is controlled using the speed of the first variable speed electric motor together with a secondary variable to achieve the desired pressure and temperature conditions of the compressed air streams. The secondary variable may include discharge pressure, as shown in FIGS. 10-12 or other selected variable such as a speed setpoint, power setpoint, motor speed ratios, discharge pressure ratios, power ratios, etc. Normal operations would typically mean that the first variable speed electric motor is adjusted to fully control the primary control variable, which is preferably the incoming feed air stream flowrate.

Non-normal operations, on the other hand, means that the primary motor speed cannot be used to achieve full control of the primary control variable because some system or external constraint is encountered. Such constraints may include one or more system process limits such as a pressure, pressure ratio, temperature, etc.; one or more compression stage limits such as a compressor wheel surge condition, margin limit, stonewall condition, vibration condition, etc.; or one or more drive assembly limits such as speed limitation, torque limitation, power limitation, bearing conditions, motor operating temperatures, and vibration conditions. Non-normal operations can also result from other air separation plant or process conditions. During non-normal operations the speed of the second variable speed electric motor is controlled using the speed of the first variable speed electric motor to achieve the desired incoming feed air stream flowrate in view of the system or external constraint.

In conventional DDCA based compression systems or IGC based compression systems, individual compressor loadings are often designed or selecting so as to balance the loadings between the parallel arranged compressors such that the compressor loadings are not optimized toward power reduction. As a result, the unit compression power for such parallel arranged compressors is typically higher than the minimum unit compression power.

To address this disadvantage, the preferred control system may also employ the use of model predictive controls to provide real-time adjustment of the compressor loading of parallel arranged compressors and optimum flow distribution between two parallel arranged compressors in the common air compression train (see FIGS. 3, 6, and 9). Such parallel compressor optimization via model predictive control is preferably targeted to reduce the air separation plant power consumption rather than balancing the compressor loading. A typical parallel compressor optimization equation is shown generically as:

$$\min_{F_1, F_2} \text{Power} = k_{F_1,1} F_1 + k_{F_1,2} F_1^2 + k_{F_2,1} F_2 + k_{F_2,2} F_2^2$$

where the total flow ($F_{total}$) is the sum of the flow to a first parallel compressor ($F_1$) and a second parallel compressor ($F_2$), k are values ascertained from characterizations and modeling of the specific compressors, and the optimization routines are subject to specific compressor constraints or limitations including: $F_1 > F_{1, surge}$; $F_2 > F_{2, surge}$; $F_1 < F_{1, max}$; and $F_2 > F_{2, max}$.

Sacrificial Rigid Shaft Coupling

Figure 13:
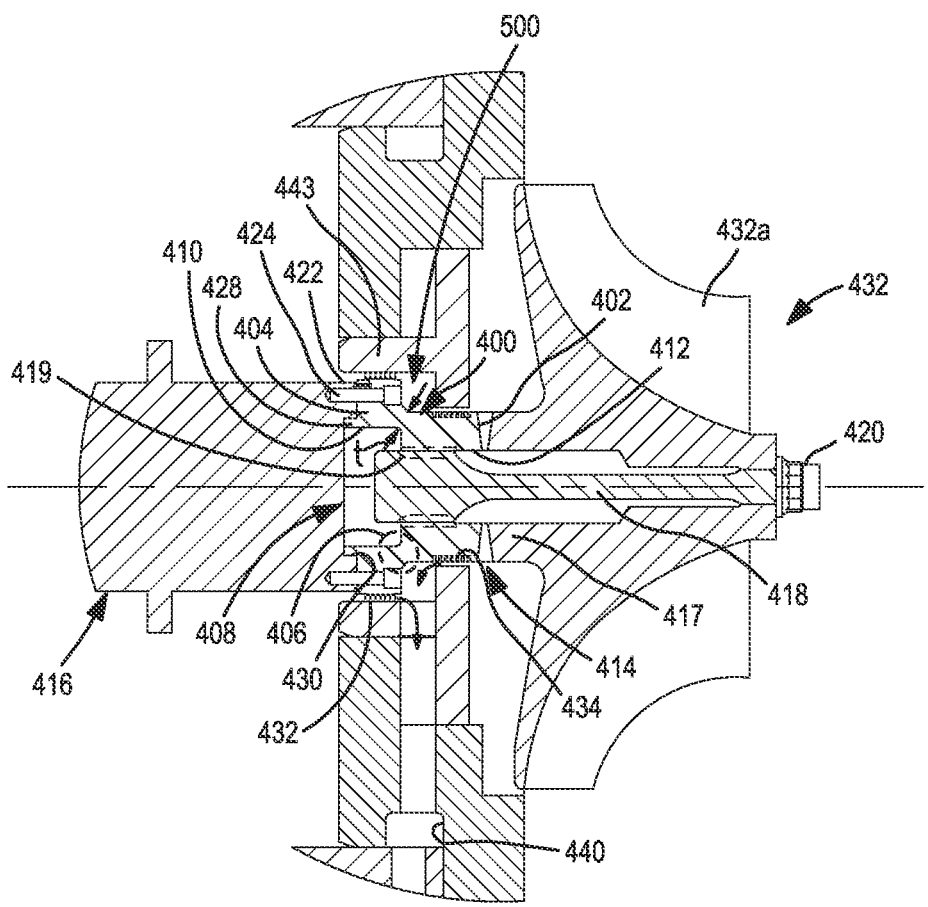
FIG. 13 is a schematic, fragmentary view of the sacrificial rigid shaft coupling arrangement between a motor shaft and an impeller.

In all of the aforementioned embodiments, the high speed electric motor assemblies each having a motor body, a motor housing, and a motor shaft with one or more impellers directly and rigidly coupled to the motor shaft using a sacrificial rigid shaft coupling. As shown in FIG. 13, the sacrificial rigid shaft coupling 500 is provided with a coupling body 400 which includes opposed first and second ends 402 and 404. The coupling is connected at the first of the ends 402 to the impeller 432 and at the second of the ends 404 to the motor shaft 416. The coupling body 400 has a deformable section 406 highlighted in the dashed circle that will deform under a desired unbalanced loading exerted against the coupling body upon failure of the impeller 432 allowing it to permanently deform and do so without the deformable section 406 exceeding the ultimate strength of a material forming the coupling body 400 and to limit the unbalanced load force and moment to prevent permanently deforming the motor shaft 416 and which can result in a failure of the journal bearings. In this regard, such a material could be a high ductility metal, with yield strength sufficiently large to handle normal design loads, yet sufficiently low to limit unbalanced load forces and moments from permanently deforming the motor shaft, meanwhile the combination of elastic and ultimate strength allow the impeller to touch the shroud without cracks occurring in the coupling. Such a material could be 15-5PH (H1150) stainless steel.

As illustrated, section deformable 406 has a sufficiently large annular shaped area, as viewed in an outward radial direction thereof that with a given material is sufficient to transmit the torque from the motor shaft 416 to the impeller 432 during normal intended operation. It is also a short section as viewed in an axial direction parallel to the motor shaft 416 so as to be sufficiently stiff as not to allow undesirable motor shaft vibrations during such normal operation. However, in case of a failure of the impeller 432, the section 406 is designed to undergo a stress that will exceed the elastic limit of the material making up the coupling and thereby deform without exceeding the ultimate strength or ultimate limit of such material. As a result of such deformation the first of the ends 402 of the coupling 500 will begin to rotate in a clockwise direction with the end result of the impeller 432 striking the shroud of compressor. Put another way, the coupling sacrifices itself by yielding in section 406 for the sake of the motor. After a failure of the coupling, the motor will not have a permanently deformed shaft 416 and potentially have reusable bearings. The motor will still be able to be used and the arrangement can be renewed by refurbishment of the compressor.

Deformable section 406 is produced by providing the coupling body 400 with an axial bore 408 that has a wider portion 410 inwardly extending from the second of the ends 404 toward the first of the ends 402 and a narrow portion 412 extending from the wider portion 410 toward the second of the ends 402. This results in the coupling body having a reduced wall thickness "t" at a location along axial bore 408 that will act as a weak point at which the coupling body 400 will deform. Thus, deformable section 406 forms a juncture between the wider and narrower portions 410 and 412 of the axial bore 408. Typically, failure of the impeller will be due to the loss or partial loss of an impeller blade 432a. The deformable section is then designed to fail or in other words deform as a result of a certain imbalance and under a loading produced at an operational motor speed. At the same time sufficient cross-sectional area must be provided to allow torque transmission and vibration during normal operation. As can be appreciated, other designs could be used in producing deformable section or a sacrificial rigid shaft coupling. For example, if the axial bore 408 were of constant diameter, an outer circumferential groove-like portion within the coupling body 400 could produce such a deformable section.

As seen in FIG. 13, the connection between impeller 432 and the coupling 500 is preferably a clutch type toothed coupling 414 provided by an interlocking arrangement of teeth. The teeth are provided both at the first of the ends 402 of the coupling body 400 and also on a hub 417 of the impeller 432. This clutch type toothed coupling has many variations and names but, is typically referred to as a "HIRTH" type of coupling. In order to maintain contact and provide torque transmission, a preloaded stud 418 can be connected to coupling 500 by a threaded type connection 419 within the narrower section 412 of the axial bore 408 of the coupling body 400. A nut 420 threaded onto the stud 418 holds the hub 417 of the impeller 432 against the first of the ends 402 of the coupling body 400 and therefore, the clutch type toothed coupling 414 in engagement. As can be appreciated by those skilled in the art, numerous other means could be provided for connecting the impeller 432 to the coupling 500, for instance a friction, keyed, polygon, or interference fit.

The connection between motor shaft 416 and the second of the ends 404 of the coupling 500 is provided by an annular flange-like section 422 of the coupling body 400 surrounding the wider portion 410 of the axial bore 408. A set of preloaded screws 424 pass through the flange-like section 422 and are threadably engaged within bores (not shown) provided in the end of the motor shaft 416. Preferably the coupling body 400 has an annular projection 428 that seats within a cylindrical, inwardly extending recess 430 situated at the end of the motor shaft 416 to center the coupling body 400 with respect to the motor shaft 416. This provides better centering of impeller 432 with shaft 416 and helps in the assembly thereof.

Preferably, rotating labyrinth seal elements 432 and 434 are part of the coupling 500 and as illustrated, are provided on exterior portions of the annular flange-like section 422 and the first of the ends 402 of the coupling body 400. These elements engage complimentary labyrinth seal elements situated on the shaft seal 443 within a housing of the electric motor adjacent the impeller 432. By placing both the necessary process gas shaft seal and the rotor air gap cooling stream shaft seal on the coupling, impeller overhang is minimized and the chances of creating a rigid rotor and preferable rotor dynamics is allowed. The seals, while typically rotating labyrinths, could be a brush or carbon ring seal. A secondary benefit of minimizing impeller overhang is that should damage to the seals occur, which can occasionally happen, only the coupling needs replacing. This is in contrast to seals typically located on the rotor which would need renovation or replacement. Shaft seal 443 forms the stationary sealing surfaces between rotating labyrinth seals 432 and 434 which control the motor cooling gas leakage flow and compressor process gas leakage flow, respectively. The motor cooling gas leakage flow and compressor process gas leakage flow combine to form a total leakage flow which generally exits from a passage 440 in volute.

While the present invention has been described with reference to a preferred embodiment or embodiments and operating methods associated therewith, it is understood that numerous additions, changes and omissions to the disclosed systems and methods can be made without departing from the spirit and scope of the present inventions as set forth in the appended claims.

What is claimed is:

1. A method for compression of an incoming feed air stream to a cryogenic air separation plant, the method comprising the steps of:
   (a) compressing the incoming feed air stream in a lower pressure compressor of a common air compression train, the lower pressure compressor driven directly by a single ended first variable speed electric motor assembly configured to operate at speeds of between 5000 rpm and 9000 rpm to produce a first compressed feed air stream, wherein the lower pressure compressor is directly and rigidly coupled to the first variable speed electric motor assembly via a sacrificial rigid shaft coupling;
   (b) further compressing the first compressed feed air stream in one or more intermediate pressure compression stages of the common air compression train configured as part of an integrally geared compressor arrangement to produce a second compressed feed air stream;
   (c) further compressing the second compressed feed air stream in higher pressure compressors of the common air compression train to produce a third compressed feed air stream, wherein the higher pressure compressors are directly and rigidly coupled to a double ended second variable speed electric motor assembly via respective sacrificial rigid shaft couplings and driven by the double ended second variable speed electric motor assembly configured to operate at speeds of between 5000 rpm and 9000 rpm, wherein the higher pressure compressors further comprises one compression stage or one compressor unit mounted on one end of the double ended second variable speed electric motor assembly, and another compression stage or another compressor unit mounted on the other end of the double ended second variable speed electric motor assembly;
   (d) purifying the third compressed feed air stream to remove impurities to produce a compressed and purified feed air stream;
   (e) directing one or more portions of the compressed and purified feed air stream to a split functional air compression train having one or more additional compression stages;
   (f) directing the one or more of the portions of the compressed and purified feed air stream in the split functional air compression train to a primary heat exchanger in order to cool the one or more portions to temperatures suitable for rectification in a distillation column system of the cryogenic air separation plant; and
   (g) directing some or all of the one or more of the portions of the cooled, compressed and purified feed air stream after exiting the primary heat exchanger to a distillation column system of the cryogenic air separation plant to produce liquid and gaseous products;
   wherein the speed of the first variable speed electric motor assembly is adjusted in response to changes in operating conditions of the cryogenic air separation plant and a measured flow rate of air in the common air compression train;
   wherein the speed of the second variable speed electric motor assembly is thereafter adjusted in response to changes in the speed of the first variable speed electric motor assembly, and a measured pressure of at least one of the portions of the compressed and purified air stream in the split functional air compression train; and wherein the ratio of the speeds of the higher pressure compressors driven by the second variable speed-electric motor assembly at speeds of between 5000 rpm and 9000 rpm remains constant before and after said adjustment and the ratio of the speed of the first compression stage or first compressor unit and the speed of the higher pressure compressors prior to said adjustment is different than the ratio of the speed of the first compression stage or first compressor unit and the speed of the higher pressure compressors driven by the second variable speed electric motor assembly after said adjustment.

2. The method of claim 1 wherein the speed of the first variable speed—electric motor assembly is reduced such that the cryogenic air separation plant is turned down and a reduced volumetric flow of the incoming feed air stream to the cryogenic air separation plant is between 50% to 70% of a designed volumetric flow of the incoming feed air stream for the cryogenic air separation plant, and wherein the reduced volumetric flow of the incoming feed air stream is compressed in the lower pressure compressor of the common air compression train; and wherein the speed of the second variable speed electric motor assembly is thereafter adjusted in response to the measured pressure of at least one of the portions of the compressed and purified air stream in the split functional air compression train and the reduced speed of the first variable speed electric motor assembly.

3. The method of claim 1 wherein the speed of the first variable speed electric motor assembly is adjusted in response to changes in operating conditions of the cryogenic air separation plant and the measured flow rate of air in the common air compression train and wherein the speed of the second variable speed electric motor assembly is thereafter adjusted in response to the measured pressure of at least one of the portions of the compressed and purified air stream in the split functional air compression train, a discharge pressure in the common air compression train and the speed of the first variable speed electric motor assembly.

4. The method of claim 1 wherein the speed of the first variable speed electric motor assembly is adjusted in response to changes in operating conditions of the cryogenic air separation plant, the measured flow rate of air in the common air compression train, and one or more process limits and wherein the speed of the second variable speed electric motor assembly is thereafter adjusted in response to the measured pressure of at least one of the portions of the compressed and purified air stream in the split functional air compression train, the one or more process limits and the speed of the first variable speed electric motor assembly.

5. The method of claim 1 wherein the speed of the first variable speed electric motor assembly is adjusted in response to changes in operating conditions of the cryogenic air separation plant, the measured flow rate of air in the common air compression train, and one or more compression stage limits and wherein the speed of the second variable speed electric motor assembly is thereafter adjusted in response to the measured pressure of at least one of the portions of the compressed and purified air stream in the split functional air compression train, the one or more compression stage limits, and the speed of the first variable speed electric motor assembly.

6. The method of claim 1 wherein the speed of the first variable speed electric motor assembly is adjusted in response to changes in operating conditions of the cryogenic air separation plant, the measured flow rate of air in the common air compression train, and one or more electric motor assembly limits and wherein the speed of the second variable speed electric motor assembly is thereafter adjusted in response to the measured pressure of at least one of the portions of the compressed and purified air stream in the split functional air compression train, the one or more electric motor assembly limits, and the speed of the first variable speed electric motor assembly.

7. The method of claim 1 wherein the speed of the first variable speed electric motor assembly or the speed of the second variable speed electric motor assembly or both are further adjusted periodically in response to diversion or venting of a portion of the compressed air from the common air compression train.

8. The method of claim 1 wherein the speed of the first variable speed electric motor assembly or the speed of the second variable speed electric motor assembly or both are further adjusted in response to changes in ambient air conditions.

9. The method of claim 1 wherein the two or more portions of the compressed and purified air stream in the split functional air compression train respectively comprise a boiler air stream and an upper column turbine air stream, and the measured pressure of at least one of the portions of the compressed and purified air stream in the split functional air compression train is a measured pressure of the boiler air stream or a measured pressure of the upper column turbine air stream.

10. The method of claim 1 wherein the two or more portions of the compressed and purified air stream in the split functional air compression train respectively comprise a boiler air stream and an lower column turbine air stream, and the measured pressure of at least one of the portions of the compressed and purified air stream in the split functional air compression train is a measured pressure of the boiler air stream or a measured pressure of the lower column turbine air stream.

11. The method of claim 1 wherein the two or more portions of the compressed and purified air stream in the split functional air compression train respectively comprise a boiler air stream, a turbine air stream, and a warm recycle turbine air stream, and the measured pressure of at least one of the portions of the compressed and purified air stream in the split functional air compression train is a measured pressure of the boiler air stream or a measured pressure of the turbine air stream.

12. The method of claim 1 wherein the step of purifying the third compressed feed air stream to remove impurities further comprises purifying the third compressed feed air stream in an adsorptive pre-purification unit.

13. The method of claim 12 further comprising the steps of:
periodically diverting a portion of the compressed feed air stream from the common air compression train; and
repressurizing the adsorptive pre-purification unit with the portion of diverted air from the common air compression train.

14. The method of claim 1 further comprising the step of discharging a portion of the first compressed feed air stream, second compressed feed air stream, or third compressed feed air stream out of the common air compression train via a vent.

* * * * *